(12) United States Patent
Chalker et al.

(10) Patent No.: US 11,591,087 B2
(45) Date of Patent: Feb. 28, 2023

(54) UNMANNED AERIAL VEHICLE WITH DUCTED ROTORS

(71) Applicants: Donald Lee Chalker, Jacksonville, FL (US); Eyal Wirsansky, Jacksonville, FL (US)

(72) Inventors: Donald Lee Chalker, Jacksonville, FL (US); Eyal Wirsansky, Jacksonville, FL (US)

( * ) Notice: Subject to any disclaimer, the term of this patent is extended or adjusted under 35 U.S.C. 154(b) by 304 days.

(21) Appl. No.: 16/842,670

(22) Filed: Apr. 7, 2020

(65) Prior Publication Data
US 2020/0317337 A1      Oct. 8, 2020

Related U.S. Application Data

(60) Provisional application No. 62/830,490, filed on Apr. 7, 2019.

(51) Int. Cl.
*B64C 39/02*    (2023.01)
*B64C 27/20*    (2023.01)
(Continued)

(52) U.S. Cl.
CPC ............ *B64C 39/024* (2013.01); *B64C 27/20* (2013.01); *B64C 27/52* (2013.01); *B64D 25/00* (2013.01);
(Continued)

(58) Field of Classification Search
CPC ....... B64C 39/024; B64C 27/20; B64C 27/52; B64C 2201/027; B64C 2201/108;
(Continued)

(56) References Cited

U.S. PATENT DOCUMENTS

| | | | | |
|---|---|---|---|---|
| 2,921,435 A | * | 1/1960 | Landgraf | .................. B64C 9/38 |
| | | | | 239/455 |
| 6,572,053 B2 | * | 6/2003 | Salas | ........................ B60V 1/02 |
| | | | | 244/73 C |

(Continued)

FOREIGN PATENT DOCUMENTS

| CN | 105799927 A | * | 7/2016 | |
|---|---|---|---|---|
| CN | 108516089 A | * | 9/2018 | ............. B64C 27/08 |

(Continued)

OTHER PUBLICATIONS

Garrow Aircraft's Verticopter VTOL concept; YouTube Video (https://www.youtube.com/watch?v=mJc6TX7Reoo&feature=youtu.be).
(Continued)

*Primary Examiner* — Benjamin P Lee
(74) *Attorney, Agent, or Firm* — Camille A. Wilson; Wilson Dutra, PLLC

(57) ABSTRACT

The present disclosure provides a system and device for drones with ducted rotors. In some aspects, drones may comprise one or more systems of ducted rotors. In some embodiments, ducted rotors may increase the durability of the drone, limiting exposure of the rotors to external conditions and objects. In some aspects, a drone with ducted rotors may comprise a control vane or cone that may direct airflow within the drone as a mechanism to control flight path. In some implementations, a drone may comprise expandable landing gear than may allow for controlled landing, even in the event of rotor failure. In some aspects, a drone may comprise rotatable ducted rotors.

19 Claims, 22 Drawing Sheets

(51) Int. Cl.
*B64C 27/52* (2006.01)
*B64D 25/00* (2006.01)
*B64U 10/13* (2023.01)
*B64U 30/20* (2023.01)
*B64U 50/14* (2023.01)
*B64U 101/00* (2023.01)

(52) U.S. Cl.
CPC .............. *B64U 10/13* (2023.01); *B64U 30/20* (2023.01); *B64U 50/14* (2023.01); *B64U 2101/00* (2023.01)

(58) Field of Classification Search
CPC .......... B64C 2201/12; B64C 2201/162; B64C 11/00; B64C 29/0016; B64D 25/00
See application file for complete search history.

(56) References Cited

U.S. PATENT DOCUMENTS

| | | | | |
|---|---|---|---|---|
| 6,616,094 | B2* | 9/2003 | Illingworth | B64C 39/064 244/12.1 |
| 9,045,227 | B1* | 6/2015 | Gramling | B64C 15/02 |
| 10,486,810 | B2* | 11/2019 | Lan | B64C 39/024 |
| 10,583,924 | B2* | 3/2020 | Simionescu | B64C 15/14 |
| 11,066,155 | B2* | 7/2021 | Li | B64C 27/20 |
| 11,130,585 | B2* | 9/2021 | Nakamura | B64D 17/80 |
| 11,286,051 | B2* | 3/2022 | Yagihashi | B64D 17/025 |
| 2016/0200415 | A1 | 7/2016 | Cooper | B64C 39/024 244/17.15 |
| 2017/0029097 | A1* | 2/2017 | Matsumoto | B64B 1/40 |
| 2018/0093766 | A1* | 4/2018 | Ahn | G05D 1/0011 |
| 2018/0208304 | A1* | 7/2018 | Vedamanikam | B64C 29/0016 |
| 2018/0297697 | A1* | 10/2018 | Tunekawa | B64C 27/52 |
| 2018/0362157 | A1* | 12/2018 | Teetzel | B64C 39/024 |
| 2019/0002093 | A1* | 1/2019 | Muramatsu | B64B 1/32 |
| 2019/0100308 | A1* | 4/2019 | Simionescu | B64C 39/022 |
| 2019/0185161 | A1 | 6/2019 | Eleryan et al. | |
| 2019/0291858 | A1* | 9/2019 | Li | B64C 27/08 |
| 2020/0036305 | A1* | 1/2020 | John | B64C 39/024 |
| 2020/0108920 | A1* | 4/2020 | Rivellini | B64C 39/024 |
| 2020/0115049 | A1* | 4/2020 | Nakamura | B64D 17/54 |
| 2020/0198790 | A1* | 6/2020 | Yagihashi | B64C 39/024 |
| 2020/0216181 | A1* | 7/2020 | Yagihashi | B64D 25/00 |
| 2020/0262550 | A1* | 8/2020 | Dailey | B64D 17/80 |
| 2020/0339278 | A1* | 10/2020 | Nakamura | B64D 17/80 |

FOREIGN PATENT DOCUMENTS

| | | | | |
|---|---|---|---|---|
| CN | 110087995 A | * | 8/2019 | ............. B64C 27/08 |
| WO | WO-2014080409 A1 | * | 5/2014 | ........... B64C 39/028 |
| WO | WO-2019039062 A1 | * | 2/2019 | ........... B64C 39/024 |
| WO | 2019097425 | | 5/2019 | |
| WO | WO-2019090277 A1 | * | 5/2019 | ............. B64C 27/10 |

OTHER PUBLICATIONS

Bladeless Drone: First Flight; YouTube Video (https://www.youtube.com/watch?v=5L6FSdUmEpg) Oct. 14, 2018.
The Foldable Drone: A Morphing Quadrotor that can Squeeze and Fly; YouTube Video (https://www.youtube.com/watch?v=jmKXCdEbF_E) Dec. 11, 2018.
Cleo Robotics—Dronut; https://cleorobotics.com; Cleo Robotics—© 2019.
Dual Propeller Circular Drone—Flybotix; YouTube Video (https://www.youtube.com/watch?v=qwOJcAlnJaU) Jul. 17, 2019.
Flybotix single rotor technology and dual rotor drones; YouTube Video (https://www.youtube.com/watch?v=aRRDhrkgfHE) Jun. 23, 2019.
Gyroscopic Multi-movement Ducted Propellers For Aircraft; https://contest.techbriefs.com/2015/entries/aerospace-and-defense/5647; © 2020 Tech Briefs Media Group.
https://turftank.com; © 2016-2018.

* cited by examiner

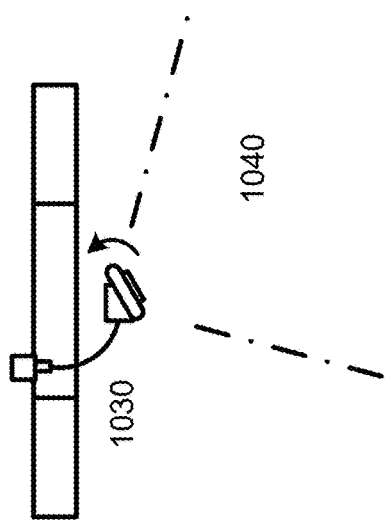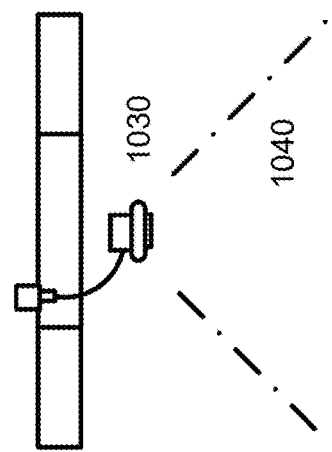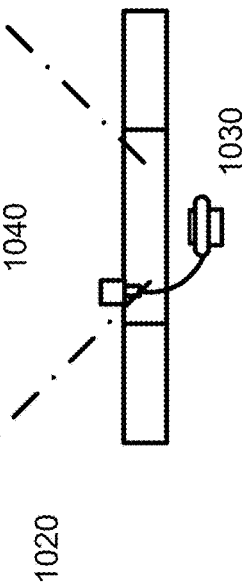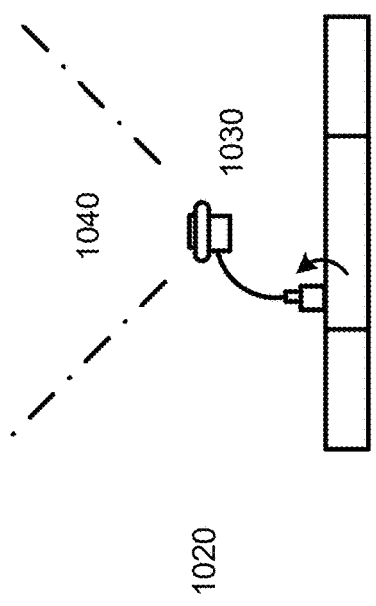

1100

1110    1115

1100

1110    1115

1110

1120

1100

1110

1120

1115

1300

1400

1400

UNMANNED AERIAL VEHICLE WITH DUCTED ROTORS

CROSS-REFERENCE TO RELATED APPLICATION

This application claims priority to and the full benefit of U.S. Provisional Patent Application Ser. No. 62/830,490, filed Apr. 7, 2019, and titled "UNMANNED AERIAL VEHICLE FOR EMERGENCY RESPONSE AND ADAPTABILITY", the entire contents of which are incorporated in this application by reference.

BACKGROUND OF THE DISCLOSURE

An unmanned aerial vehicle (UAV), now commonly referred to as a drone, is a vehicle without a human pilot. Drones are pilotless aircraft that may be flown by remote control or through the use of on-board computers. The earliest UAVs were used in the military. For example, some consider the earliest version of the UAV to be balloon carriers used during the First World War, where balloon carriers were launched with incendiary firepower without a human controlling the target or destination. Since these balloons relied on wind to reach their targets, the earliest version of the UAV were not particularly successful.

After the First World War, pilotless aerial torpedoes were developed that exploded at a preset time. Aerial technology eventually caught up with human imagination, particularly helped by breakthroughs within transistor technology, leading to unmanned planes that could carry explosive payloads to predetermined targets. In the 1970s, UAVs were used as decoys during war to hoodwink opposing forces into squandering expensive ammunition. As technology advanced, interest in and demand for UAVs grew tremendously within the military by the 1980s and 1990s.

Drones were developed for a variety of purposes, such as decoy, reconnaissance, combat, logistics, research, and, eventually, commercial applications. In the commercial sector, drones can be further divided into ready-to-fly, bind-and-fly, do-it-yourself, and bare frame categories. This range is based on the user's prior knowledge of drones. For example, a budding enthusiast is more likely to purchase a "ready-to-fly" drone for their first drone experience. In its current manifestation, drones are usually made up of a body, power supply, actuators, sensors, and internal logic that enables the drone to function, like microcontrollers, control architecture, and processing software.

Some drones have started to integrate computer vision and machine learning technology into their camera systems. This enabled better tracker for people, animals, and objects as well as better situational awareness to avoid nearby obstacles. This expanded the capabilities of drones, which was otherwise limited to following global positioning systems (GPS) signals.

Drones are also being used to improve emergency prevention, response, and recovery operations, such as search and rescue operations, policing, and firefighting. Drones are being used to reduce costs, cut response times, and more effectively capture emergency response efforts for internal improvement and accountability. For example, some drones may have thermal imaging cameras to provide insights during a fire, helping direct firefighters on where to more effectively direct their water sprays. For the police, drones may be used for search and rescue missions, for crime scene documentation, and even traffic monitoring for larger events. During disaster relief situations, drones were used to assess critical infrastructure damage, show updates on recovery progress, and inform homeowners about the condition of their homes.

Despite these innovations, drone dependability and maneuverability are still ongoing issues with this use case. Drones are limited by their shape and size when facing unfavorable or dangerous weather conditions. Despite their use for visibility, there may be situations where the size of a drone limits this functionality, forcing emergency response teams to be more involved during a data gathering task. Further, drones may be limited as to how it communicates with other human beings, other drones, and other aerial vehicles during a reconnaissance or emergency mission.

SUMMARY OF THE DISCLOSURE

What is needed is a system and device for drones to be effective during emergency scenarios. In some embodiments, a drone may be outfitted for a particular emergency environment type, such as a fire, a hurricane, or an active scenario. In some implementations, a drone may be configured in real-time to address or respond to a particular emergency scenario, such as adapt its shape to fit under rubble when searching for remaining survivors.

In some aspects, a drone may communicate to personnel, survivors, perpetrators, or other devices if necessary, such as through an onboard or detachable communication device. For example, a drone may inform personnel what conditions are like, whether a location is safe, or whether there is any damage. In some embodiments, a user controlling the drone may communicate as necessary through the drone. In some implementations, a drone may identify certain situations and communicate with a control base or user accordingly, such as when there are signs of fire, strong winds, or changes in the soil. In some aspects, a drone may enable this functionality with a device add-on.

The present disclosure relates to a drone with ducted rotors, wherein the drone may comprise a body; a first duct connected to the body; a first rotor system located within the first duct, wherein the first rotor system provides lift and propulsion for flight of the drone; a power source connected; a control mechanism configured to operate flight of the drone, wherein the control mechanism may be in logical communication with the power source; a communication mechanism configured to receive instructions for operation of the drone and relay instructions to the control mechanism; a directional control mechanism configured to affect a direction of flight of the drone; and a housing connected to the body, wherein the housing contains at least a portion of one or more of the power source, the control mechanism, the communication mechanism, and the directional control mechanism.

Implementations may comprise one or more of the following features. In some aspects, the directional control mechanism may comprise a vane that controls direction of airflow from the first rotor system, and the direction of airflow may control the direction of flight. In some embodiments, the directional control mechanism may comprise a cone that controls direction of airflow from the first rotor system, and the direction of airflow may control the direction of flight. In some implementations, the duct may be located centrally to the body.

In some implementations, a drone may comprise a second duct connected to the body, and a second rotor system located within the second duct, wherein the first rotor system and the second rotor system provide lift and propulsion for flight of the drone. In some aspects, the body may be located between the first duct and the second duct. In some embodiments, the drone may be configured to operate with one or both the first rotor system and the second rotor system.

In some aspects, loss of either the first rotor system or the second rotor system may cause a shift in orientation of the body. In some embodiments, the first rotor system and the second rotor system may be independently controllable. In some aspects, the first rotor system and the second rotor system may be controllable as a single system.

In some implementations, the drone may further comprise an expandable landing mechanism configured to slow a descent of the drone. In some embodiments, the expandable landing mechanism may be configured to deploy if the first rotor system fails. In some aspects, the body may comprise a walled frame, and the expandable landing mechanism may comprise a series of expandable panels lining the walled frame. In some embodiments, the expandable landing mechanism may comprise collapsible wings. In some aspects, the expandable landing mechanism may be configured to rotate on descent when deployed.

In some implementations, an angle of the first duct may be adjustable. In some embodiments, the angle of the first duct may affect the direction of flight, and the directional control mechanism may adjust the angle of the first duct. In some aspects, an angle of the first rotor system may be adjustable. In some implementations, the directional control mechanism may adjust the angle of the first rotor system. In some embodiments, a first angle of the first rotor system may provide primarily lift and a second angle of the first rotor system may provide primarily propulsion. Implementations of the described techniques may comprise hardware, a method or process, or computer software on a computer-accessible medium.

A system of one or more computers may be configured to perform particular operations or actions by virtue of having software, firmware, hardware, or a combination of them installed on the system that in operation may cause the system to perform the actions. One or more computer programs may be configured to perform particular operations or actions by virtue of including instructions that, when executed by data processing apparatus, may cause the apparatus to perform the actions. In some aspects, corresponding computer systems, apparatus, and computer programs recorded on one or more computer storage devices, may be configured to perform the actions of the methods.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 10A illustrates an exemplary hollow body for use with a drone, wherein a central opening of the hollow body may increase a range of visibility for a camera installed on the hollow body, according to some embodiments of the present disclosure.

FIG. 10B illustrates an exemplary hollow body for use with a drone, wherein a central opening of the hollow body may increase a range of visibility for a camera installed on the hollow body, according to some embodiments of the present disclosure.

FIG. 10C illustrates an exemplary hollow body for use with a drone, wherein a central opening of the hollow body may increase a range of visibility for a camera installed on the hollow body, according to some embodiments of the present disclosure.

FIG. 10D illustrates an exemplary hollow body for use with a drone, wherein a central opening of the hollow body may increase a range of visibility for a camera installed on the hollow body, according to some embodiments of the present disclosure.

DETAILED DESCRIPTION

The present disclosure provides generally for a drone device able to reconfigure or communicate audio. According to the present disclosure, the drone device may be able to communicate audio both to and from using some sort of microphone system. The drone device may also be transformed into different shapes, both smaller and larger, as well as able to withstand both mechanical and physical failure in case of damage to the drone device.

In the following sections, detailed descriptions of examples and methods of the disclosure will be given. The description of both preferred and alternative examples though thorough are exemplary only, and it is understood that to those skilled in the art variations, modifications, and alterations may be apparent. It is therefore to be understood that the examples do not limit the broadness of the aspects of the underlying disclosure as defined by the claims.

Glossary

Drone: as used herein refers to an unmanned aerial device. References made generally to a drone may also mean a reference to the components of the drone. Components may include a camera, a microphone, a speaker, an audio communication device, power source, rotor blades, local computer processing unit, software, control mechanism, wireless communication, or other electronic components, as non-limiting examples.

Audio Communication Device: as used herein refers to a device that may allow for at least two-way communication, such as between two individuals. In some aspects, the audio communication device may comprise audio components, such as a speaker and microphone, as non-limiting examples. In some embodiments, the audio communication device may logically connect with external devices with audio components, such as a smartphone, radio, or other sound system.

Expandable Landing Mechanism: as used herein refers to a deployable mechanism that allows for a more controlled descent than would a free fall of the drone. An expandable landing mechanism may add sufficient drag to slow the descent, which may allow for a safer landing. In some embodiments, the expandable landing mechanism may provide a directional effect, such as gliding, that may allow for a controlled touch down. In some implementations, an expandable landing mechanism may deploy in emergency situations, such as a loss of power, rotor failure, or damage to the drone. Emergency situations may cause a uncontrollable descent, and the expandable landing mechanism may provide a passive back up option. In some aspects, an expandable landing mechanism may be deployed intentionally, such as based on efficiency of flight or power usage. In contrast to traditional landing gear, an expandable landing mechanism may affect the descent of the drone and may not provide contact leveling as the drone approaches the ground.

Figure 1:
FIG. 1 illustrates an emergency scenario with an exemplary drone is illustrated, wherein individuals may be standing on rooftops for aid, according to some embodiments of the present disclosure.

Referring now to FIG. 1, an emergency scenario with an exemplary drone 100 is illustrated, wherein individuals may be standing on rooftops for aid. In some aspects, a group may physically alert a drone 100 that they are present and need assistance. For example, a person may wave their arms to flag down a drone 100. In some implementations, a group may audibly alert a drone 100, such as by screaming or yelling.

In some aspects, the drone 100 may comprise a camera that may allow the drone 100 to recognize predefined human movements, such as waving, jumping, or falling, as non-limiting examples. In some embodiments, the drone 100 may comprise a noise detection device, which may allow the drone 100 to recognize predefined sounds that may indicate an emergency need. In some aspects, the sounds may comprise audible alerts from individuals, such as yelling certain words like help, fire, or here. In some implementations, the sounds may comprise situational sounds that may indicate an emergency, such as a car crash, emergency vehicle sirens, or gun shots. In some aspects, a camera may visually confirm emergency situations.

In some embodiments, the drone 100 may comprise an audio communication device that may allow the drone 100 to communicate with individuals. In some aspects, the audio communication device may be in logical communication with an external device, such as the drone controller or an emergency response device, wherein the external device may communicate with the individual through the audio communication device. In some implementations, the audio communication device may comprise a speaker and a microphone, wherein the microphone may receive audio inputs and the speaker may output audio received from the external device.

In some aspects, the drone 100 may obtain audio from a civilian in danger and relay that back to a user, such as an emergency responder. In some respects, the drone 100 may comprise a camera that may be able to physically see where the civilian is located. In some aspects, such as depending on the power capabilities, size, and needs, the camera may be a high definition camera allowing for clear footage of the area, the camera may be thermal allowing for identification of people and objects based on heat signatures, or the camera may have night vision capabilities to allow for visibility in low light, such as at night, in a building with no electricity, or in the middle of a storm. In some embodiments, the camera may swivel a full 360 degrees to obtain a full shot of the area around the civilian to assess the proximate safety conditions.

In some aspects, the drone 100 may be able to distinguish between voices. For example, the drone 100 may be able to isolate a voice of the person who is communicating with the drone 100 from other audible voices. As another example, the drone 100 may be able to distinguish between voices communicating, which may allow for comprehension of conversations from persons communicating with the drone 100. In some aspects, the drone 100 may transmit an audio or visual alert to draw the attention of proximate people, which may allow them to notice the presence of the drone 100.

In some embodiments, the audio communication device may allow for communication on multiple frequencies or networks, which may broaden the communication capabilities. For example, emergency responders may operate on different frequency to allow for targeted communication, such as fire response for ongoing fires, first responders for injured people, and national guard for infrastructure repair to limit further damage and injuries. In some aspects, the drone 100 may be controlled remotely by a user or entity. In some embodiments, at least a portion of the control of the drone 100 may be automated.

Figure 2:
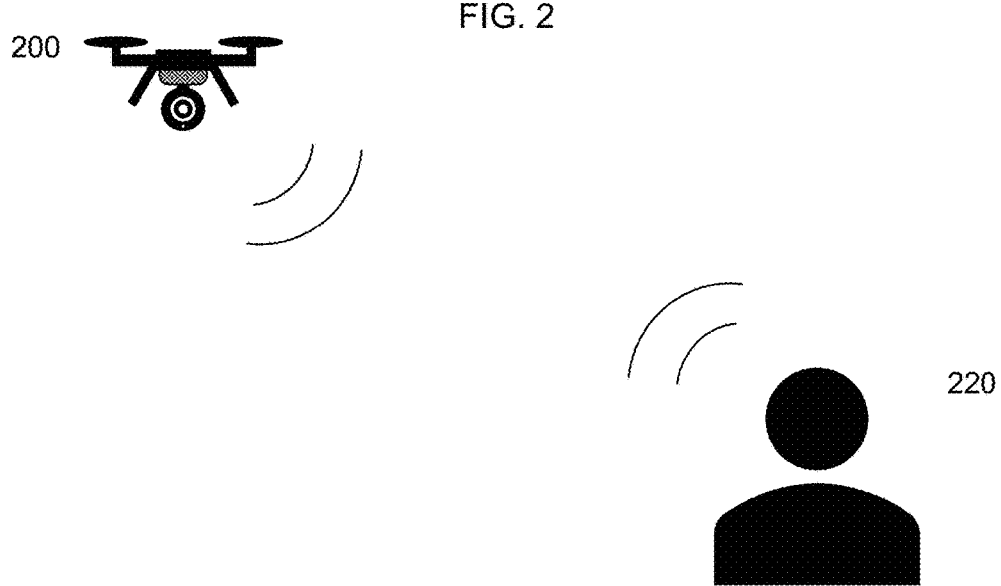
FIG. 2 illustrates an exemplary drone with audio communication device is illustrated communicating with an individual, according to some embodiments of the present disclosure.

Referring now to FIG. 2, an exemplary drone 200 with audio communication device is illustrated communicating with an individual 220. In some aspects, a drone 200 may be controlled remotely by a user. In some embodiments, the audio communication device may allow the user to communicate, such as through the remote controller. In some implementations, the audio communication device may allow a third party to communicate, such as through a radio on the same frequency, through a network, or through other wireless communication techniques, as non-limiting examples. In some aspects, the communication may be encrypted or verified to ensure secure communication.

In some aspects, the drone 200 may comprise a carrying mechanism that may be able to hold objects, such as emergency supplies. The carrying capabilities may depend on the size and weight thresholds for the drone 200. In some embodiments the carrying mechanism may be detachable or collapsible, which may allow for increased motility when not in need.

Figure 3:
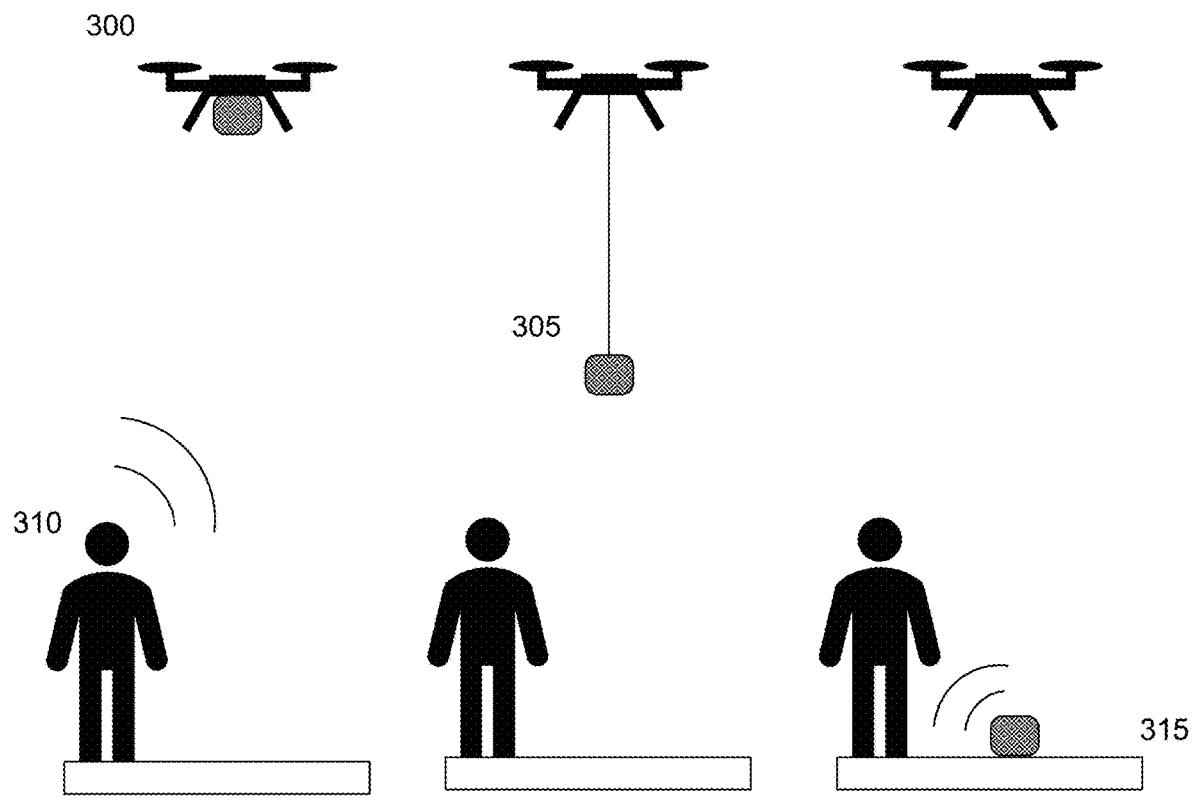
FIG. 3 illustrates an exemplary drone with detachable audio communication device, according to some embodiments of the present disclosure.

Referring now to FIG. 3, an exemplary drone 300 with detachable audio communication device 305 is illustrated. In some embodiments, a person 310 may signal to the drone 300 that they need to communicate, such as by calling for the drone 300. The drone 300 may respond by delivering a detachable audio communication device 305, which may allow for audio communication between the person 310 and a responder, such as an emergency response person or a person controlling the drone 300, as non-limiting examples.

In some implementations, the detachable audio communication device 305 may comprise the components necessary for communication. The detachable audio communication device 305 may comprise a speaker that may project received audio. In some aspects, the projected audio may be directed toward the person 310. In some embodiments, the projected audio may generally be projected without a specific direction. The detachable audio communication device 305 may comprise a microphone that may receive audio from the person 310. In some aspects, the microphone may be omnidirectional, which may allow it to receive audio regardless of where the person 310 may be located relative to the detachable audio communication device 305. In some embodiments, the microphone may be uni- or bi-directional, wherein the microphone may be oriented relative to the person 310 to effectively receive the audio.

In some implementations, the detachable communication device 305 may comprise a noise canceling feature, which may allow for more accurate receipt of audio. In some aspects, the detachable audio communication device 305 may comprise wireless communication capabilities, such as Bluetooth, infrared, or nearfield communication, as non-limiting examples. In some embodiments, the wireless capabilities may allow the detachable communication device 305 to communicate with one or more of the drone 300 and external communication devices, such as an emergency response receiver, radio, or smartphone, as non-limiting examples.

In some aspects, the drone 300 may be able to carry multiple detachable audio communication devices 305, which may allow for a scaled emergency response to multiple locations. For example, a hurricane may strand a number of people on the roof of their homes or offices, and the drone 300 may be able to deploy detachable audio communication devices 305 throughout the damaged area, which may allow for the quick assessment of emergency needs. In some embodiments, the detachable audio communication devices 305 may be recoverable, such as by transmitting a location signal for the drone 300 to follow to retrieve each detachable audio communication device 305.

In some implementations, the detachable audio communication device 305 may allow for continued communication between a person and the responder. In some aspects, the detachable audio communication device 305 may be rechargeable, such as through solar power, wind power, or USB port, which may extend the longevity. The detachable audio communication device 305 may comprise the components necessary for communication, including speaker, microphone, independent power source, processing unit, wireless communication mechanism, and electronics, as non-limiting examples. Shifting the components to a detachable audio communication device 305 may limit the weight and power burden on the drone 300.

In some aspects, the position of the detachable audio communication device 305 may be controlled through a spindle that may unwind to lower the detachable audio communication device 305. In some embodiments, the drone 300 may automatically release the detachable audio communication device 305, such as when the downward force reduces when lowered onto a platform 315, when a recipient confirms proximity, or when a geolocated position is confirmed. In some implementations, a recipient may release the detachable audio communication device 305. As non-limiting examples, the connection means may comprise clamps, hooks, straps, magnetic strips, or electromagnetism.

In some aspects, the drone 300 may carry other emergency supplies or contents, such as a first aid kit, light source, or thermal mylar blanket, as non-limiting examples. In some embodiments, the detachable audio communication device 305 may pair with the supplies, allowing for instruction on how to use the supplies. For example, a first aid kit may be delivered to a person injured in an earthquake or fire, and an emergency responder may be able to guide the person or those around her to properly apply pressure and wrap a wound.

In some embodiments, the drone 300 may be able to make visual and audio assessments of an area to determine the needs of the situation. For example, the drone 300 may be responding to a mass shooting, and the first pass over the area may provide an initial gauge of the number of people in the area and the geographic span of the incident. This assessment may occur through use of one or multiple drones 300. The assessment may occur automatically such as through computer vision coupled with audio recognition. The assessment may occur in conjunction with human confirmation and verification.

Based on the assessment, the drone 300 or drones may return to a base or hub to pick up detachable audio communication devices and supplies. From there, the drones 300 may deploy to each area of need to drop off one or more supplies and detachable audio communication device. In some embodiments, areas of need may be based on the range for the detachable audio communication. In some aspects, areas of need may be based on a threshold number or amount of damage or injury. As the area is treated, the drones 300 may return to the hub or base to replenish supplies and recharge.

Figure 4:
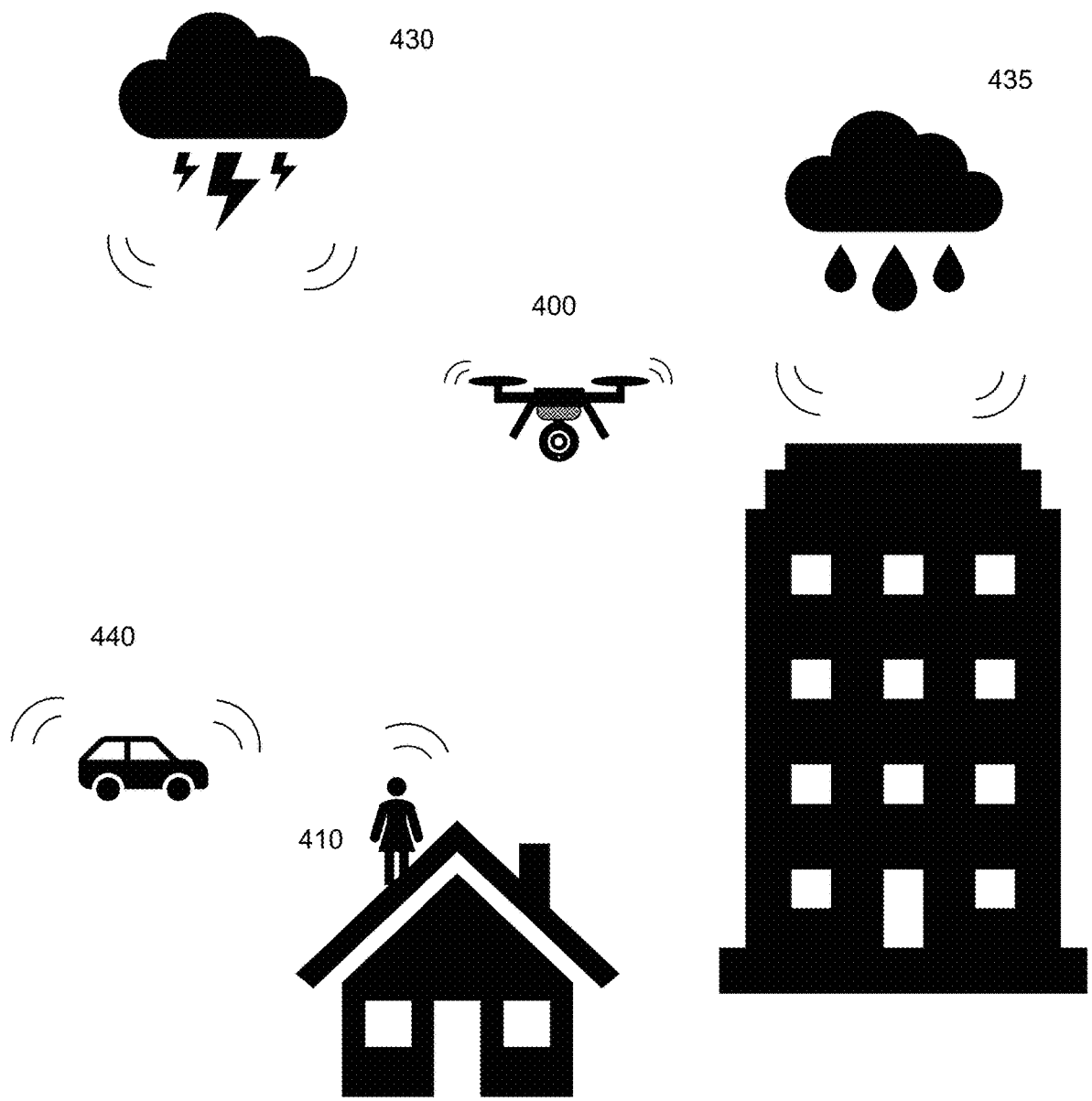
FIG. 4 illustrates a drone in exemplary conditions, according to some embodiments of the present disclosure.

Referring now to FIG. 4, a drone 400 in exemplary conditions is illustrated. In some aspects, a drone 400 may comprise one or more components and software that may allow the drone 400 to distinguish between noise sources. For example, human sound 410 may be distinguished from other ambient sounds, such as from a car 440, rain 435, or lightning 430, as non-limiting examples. In some aspects, the sounds may be classified generally as relevant sounds (such as from a human) and irrelevant sounds (any other sources). In some embodiments, the sounds may be classified by type, such as a human sound, an emergency situation sound, or non-specified noise or interference, as non-limiting examples. In some implementations, sound classifications may be confirmed visually, such as with a camera.

In some aspects, the drone 400 may comprise a wireless communication capability that may pair with external devices, such as a smartphone, car, or intercom system, as non-limiting examples. Pairing with a smartphone may increase the clarity of the communication and may allow for further distances. In some embodiments, the drone 400 may communicate through a wireless network, such as a Long-Term Evolution (LTE) network, which may allow for direct communication with a smartphone or car communications system.

For example, a drone 400 may be further away than an onboard speaker may effectively transmit sound and pairing with a smartphone may still allow for audio communication. In some embodiments, the drone 400 may give off a signal that may alert people within the wireless proximity that the drone 400 is available for communication. A person wanting to communicate may prompt their device to pair to initiate communication. In some aspects, the drone 400 may be used to communicate with a motor vehicle such as through radio frequency, emergency network, or proximate radio tower or satellite.

For example, a car may be stuck in a snowstorm and completely covered. A drone 400 may fly over the snow-covered street transmitting a signal to open communications with any person in need. The person may be able to pair one or both their car or smartphone with the drone 400. From there, the person may be able to communicate with emergency responders, and the drone 400 may be able to locate the stranded car.

In some embodiments, the drone 400 may be able to navigate through rough conditions, such as a hurricane, tornado, heavy rainfall, high winds, hail, and snow, as non-limiting examples. In some aspects the drone 400 may be used to pinpoint multiple civilians in distress at one time with a large field of view to many buildings. The drone 400 may also be used to communicate with more than one civilian in danger at a time and may relay that information directly to emergency officials.

Figure 5C:
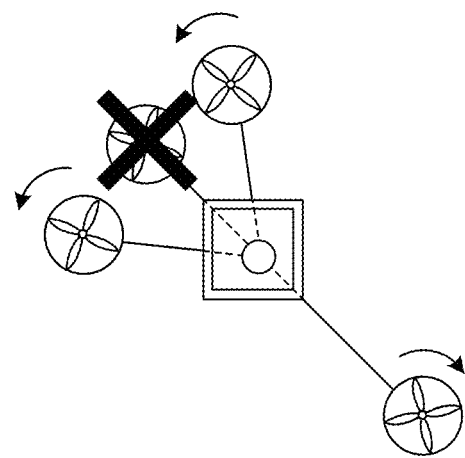
FIG. 5C illustrates an exemplary drone with adjustable rotor arms, according to some embodiments of the present disclosure.
Figure 5B:
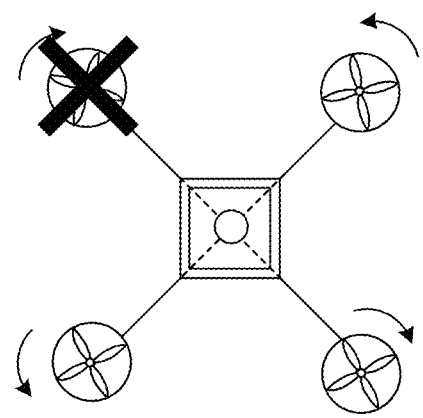
FIG. 5B illustrates an exemplary drone with adjustable rotor arms, according to some embodiments of the present disclosure.
Figure 5A:
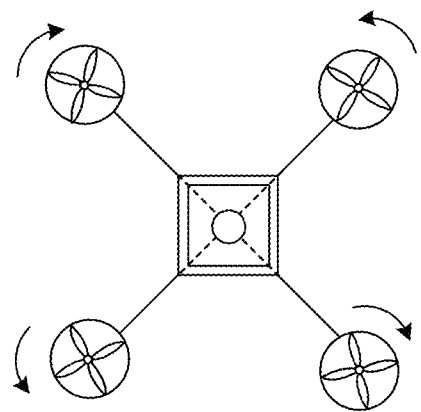
FIG. 5A illustrates an exemplary drone with adjustable rotor arms, according to some embodiments of the present disclosure.

Referring now to FIGS. 5A-5C, an exemplary drone 500 with adjustable rotor arms. In some aspects, a drone 500 may comprise four rotor arms, wherein the propellers for each rotor arms rotate counterclockwise to the two proximate propellers. In some embodiments, a propeller may break down, such as if debris catches the blades, normal wear and tear, or the rotor arm hits something, as non-limiting examples. The two proximate rotor arms may adjust to compensate for the lost propeller.

In some implementations, a central rotor arm connector may pull the proximate arms so they angle closer to the lost rotor arm, which may help rebalance thrust and angular momentum, as non-limiting examples. In some aspects, other adjustments may further stabilize the drone 500, such as by extending the rotor arm located away from the lost rotor.

For example, the rotor arms may become damaged or malfunction during an emergency response flight. In some aspects, the reconfiguration of the rotors may be automatic, such as based on a mechanical sensor that may be installed in the drone 500. The user may also be able to control the reconfiguration from a controller that controls the drone device 500. In some embodiments, the drone device 400 may be able to tell the user when a reconfiguration needs to take place and the user may be able to activate it.

Figure 6A:
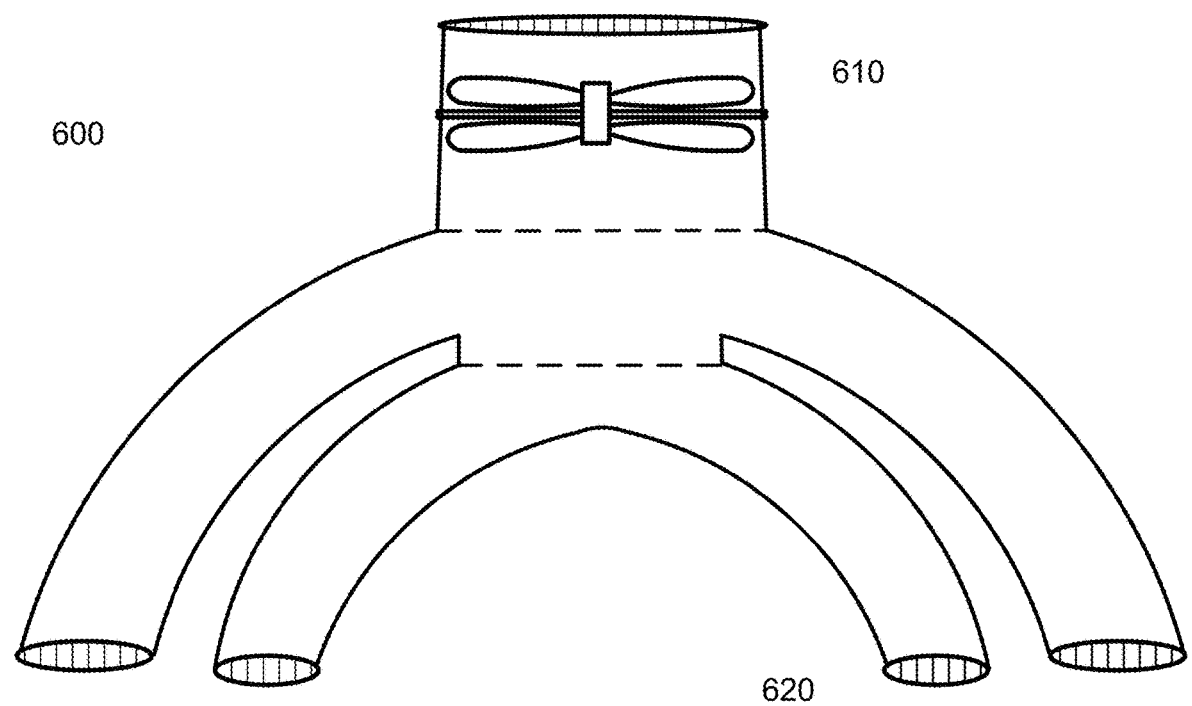
FIG. 6A illustrates a cross-section view of an exemplary drone with internal rotors, wherein downward air is directed through channels that allow for control of the drone, according to some embodiments of the present disclosure.

Referring now to FIG. 6A, a cross-section view of an exemplary drone 600 with internal rotors 610 is illustrated, wherein downward air is directed through channels 620 that allow for control of the drone 600. In some aspects, the channels may comprise adjustable vents that may allow control of airflow through the channels 620. In some embodiments, the vents may be controlled by a servo and ball crank that may individually control the airflow. Though shown at the ends of the channels 620, the vents may be located at other locations within the channels 620.

In some aspects, the drone 600 may be adjustable, wherein the channels 620 may rotate. In some embodiments, some of the channels may rotate to fit under upper channels, which may allow the drone 600 to collapse. Adjustable channel 620 positions may allow for maneuvering between variable spaces.

Figure 6B:
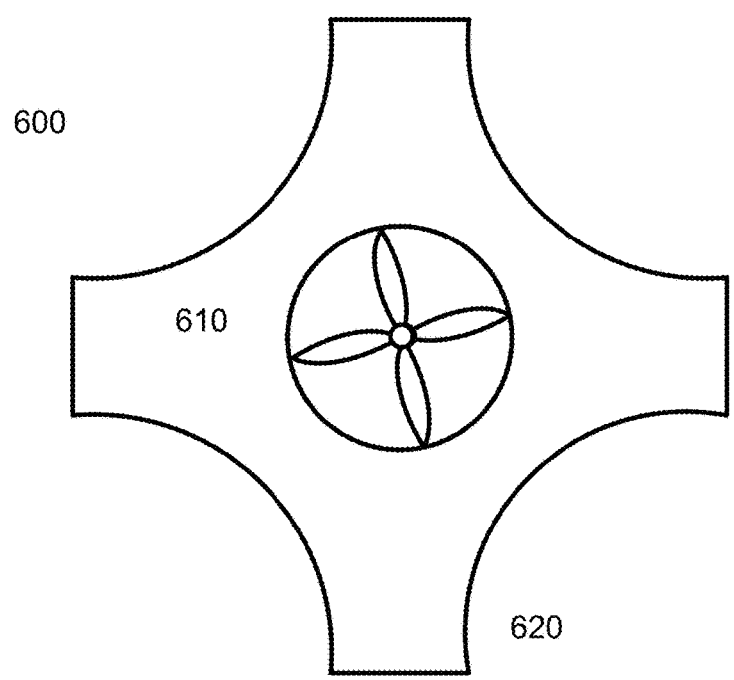
FIG. 6B illustrates a top-down view of an exemplary drone with internal rotors, wherein downward air is directed through channels that allow for control of the drone, according to some embodiments of the present disclosure.

Referring now to FIG. 6B, a top-down view of an exemplary drone 600 with internal rotors 610 is illustrated, wherein downward air is directed through channels 620 that allow for control of the drone 600. In some embodiments, the rotors 610 may be stacked, wherein the distance between them may allow for effective airflow. In some implementations, an internal rotor 610 configuration may allow for recovery if a portion of the rotors 610 malfunction or break.

In some aspects, the vents may be enclosed in the drone 600, which may limit the effect of external conditions on the position of the vents. Embodiments with internal rotors 610 may limit the danger of the rotors 610 from harming nearby objects or people. In some aspects, internal rotors 610 may limit damage to the rotors 610 as they may not be exposed or susceptible to damage from nearby objects, people, debris, or conditions. In some implementations, internal rotors 610 may create a more durable and more aerodynamic design. In some embodiments, the vents may be operated in synchrony or individually. Controlling the rotors 610 and vents may allow a user to maintain speed, accelerate, decelerate, and control direction.

Figure 7A:
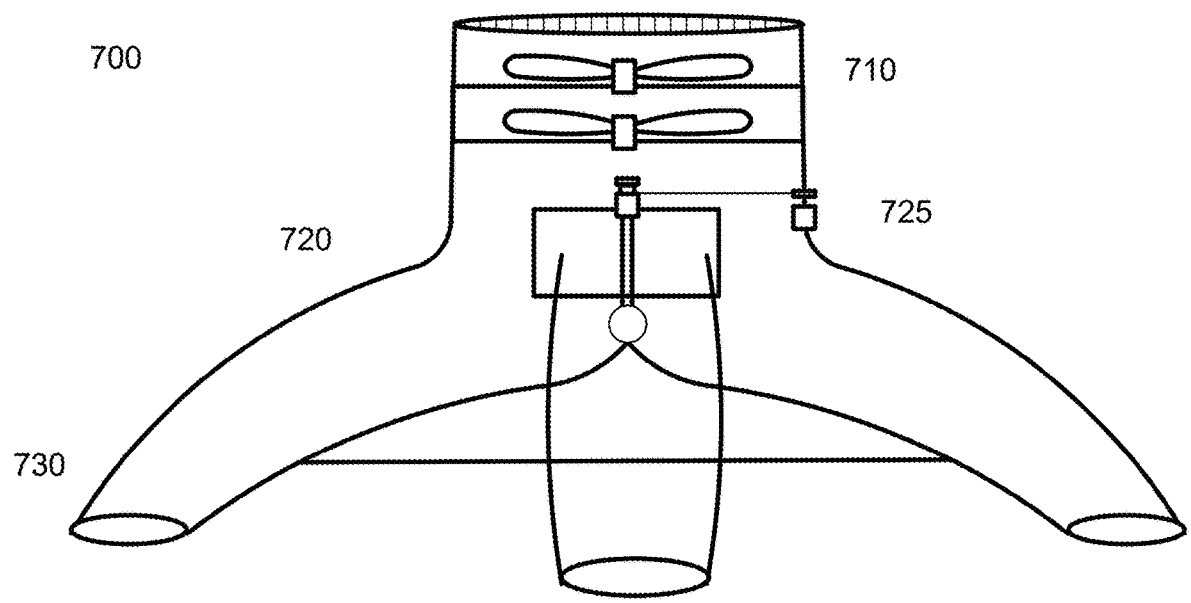
FIG. 7A illustrates a cross-section view of an exemplary drone with internal rotors, wherein downward air is directed through channels that allow for control of the drone, according to some embodiments of the present disclosure.

Referring now to FIG. 7A, a cross-section view of an exemplary drone 700 with internal rotors 710 is illustrated, wherein downward air is directed through channels 730 that allow for control of the drone 700. In some aspects, the airflow may be controlled by a central vane 720. In some embodiments, one or more servos 725 may control the location of the central vane 720. For example, two servos in perpendicular locations may control different axes of travel. In some implementations, the central vane 720 may pivot through a ball joint attachment. In some implementations, the shaft of central vane 720 may extend through the ball joint to allow control by servos located beneath the vane.

Figure 7B:
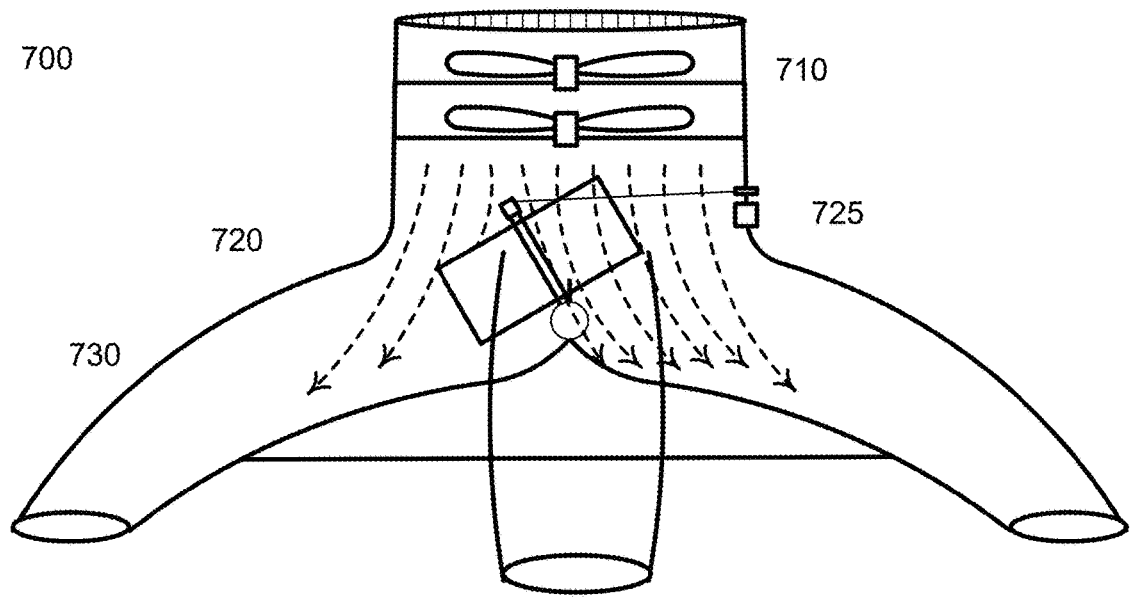
FIG. 7B illustrates a cross-section view of controlled airflow through an exemplary drone with internal rotors, wherein a central vane controls the airflow, according to some embodiments of the present disclosure.

Referring now to FIG. 7B, a cross-section view of controlled airflow through an exemplary drone 700 with internal rotors 710 is illustrated, wherein a central vane 720 controls the airflow. In some implementations, airflow may be directed toward one or more channels in the opposite direction of travel for the drone 700.

Figure 7C:
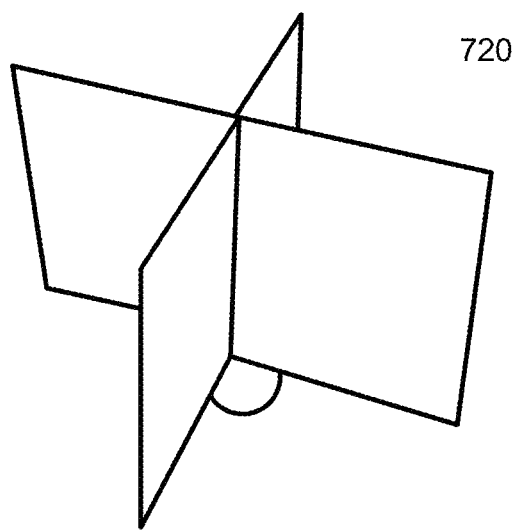
FIG. 7C illustrates a perspective view of a central vane, according to some embodiments of the present disclosure.

Referring now to FIG. 7C, a perspective view of a central vane 720 is illustrated. In some aspects, the central vane 720 may comprise multiple panels, wherein the number of panels may depend on the number of channels and the amount of control. For example, four panels may provide sufficient control for gross movements, and ten panels may provide control for more nuanced movements. In some embodiments, the panels may be adjustable, such as where the distance between each panel may be adjustable or where the angles of each panel may be adjustable. As another example, a drone 700 may comprise eight channels, wherein the central vane 720 may comprise at least eight panes to effectively control air flow through each channel.

Figure 7D:
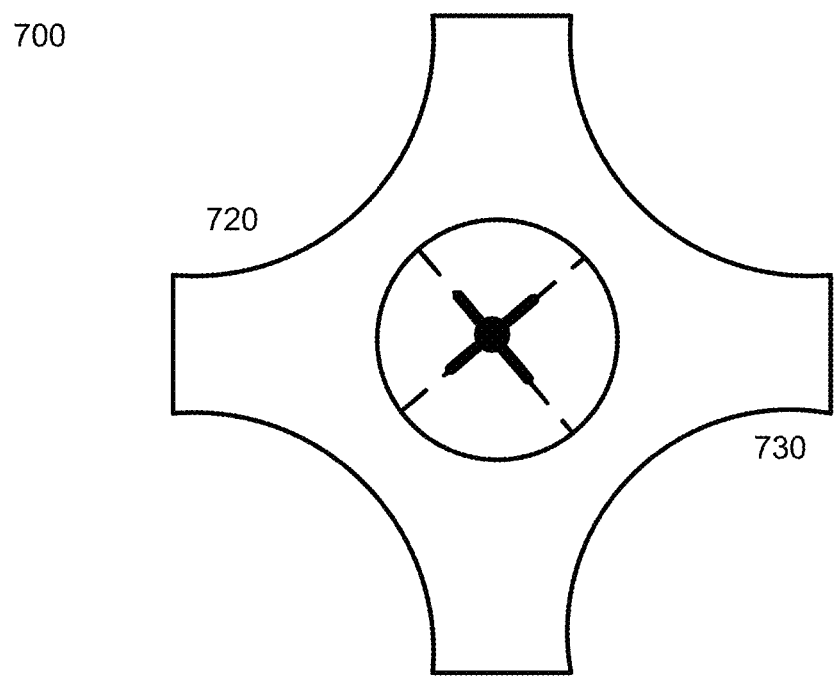
FIG. 7D illustrates a top-down view of an exemplary drone with a central vane, wherein the view is below the internal rotors, according to some embodiments of the present disclosure.

Referring now to FIG. 7D, a top-down view of an exemplary drone 700 with a central vane 720 is illustrated, wherein the view is below the internal rotors. In some aspects, the default position of the central vane 720 may be to allow equal airflow through four quadrants, one for each channel. The central vane 720 may be rotated and angled to adjust direction and speed.

Figure 8A:
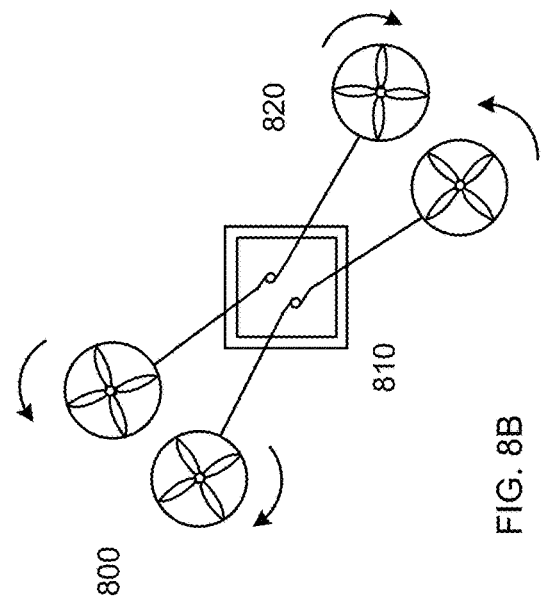
FIG. 8A illustrates an exemplary drone with adjustable rotor arms, wherein the adjustable rotor arms may allow for navigation through tight spaces, according to some embodiments of the present disclosure.
Figure 8B:
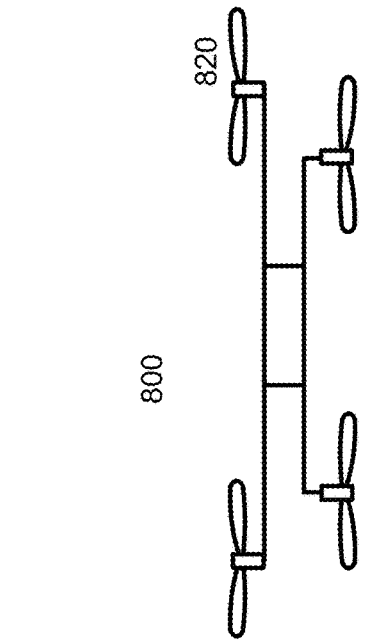
FIG. 8B illustrates an exemplary drone with adjustable rotor arms, wherein the adjustable rotor arms may allow for navigation through tight spaces, according to some embodiments of the present disclosure.
Figure 8C:
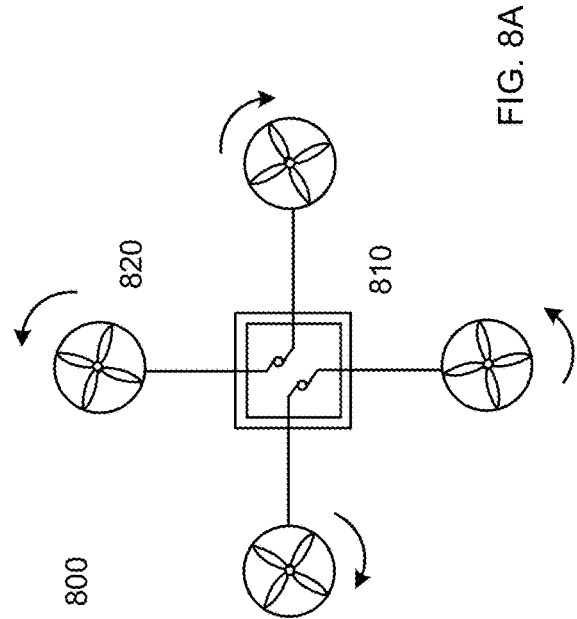
FIG. 8C illustrates an exemplary drone with adjustable rotor arms, wherein the adjustable rotor arms may allow for navigation through tight spaces, according to some embodiments of the present disclosure.
Figure 8D:
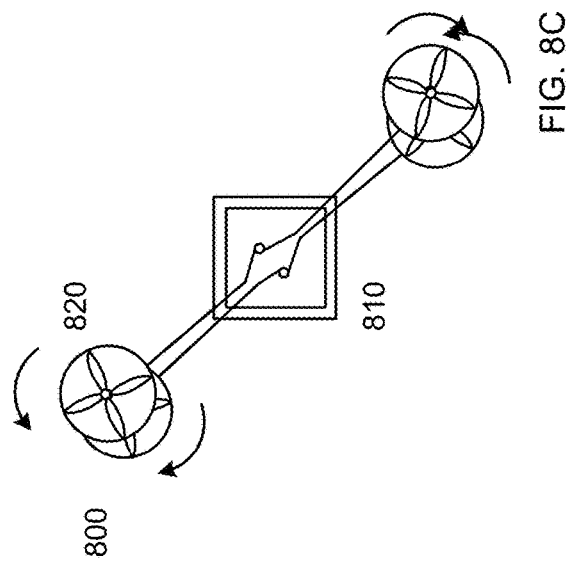
FIG. 8D illustrates an exemplary drone with adjustable rotor arms, wherein the adjustable rotor arms may allow for navigation through tight spaces, according to some embodiments of the present disclosure.

Referring now to FIGS. 8A-8D, an exemplary drone 800 with adjustable rotor arms 820 is illustrated, wherein the adjustable rotor arms 820 may allow for navigation through tight spaces. In some applications, a traditional quadcopter configuration, such as illustrated in FIG. 8A, may be effective, such as in open areas. In some embodiments, the traditional quadcopter configuration may not be as effective through tight areas, such as within or through a structure, wherein adjusting the configurations of the adjustable rotor arms 820 may allow for navigation in open areas and tight spaces.

In some implementations, the rotor arms 820 may extend from a drone body 810 on two separate planes, which may allow for the stacking of rotor arms with limited effect of each rotor. In some embodiments, the rotor arms 820 may be connected at a central pivot point (not shown) that may allow for the rotor arms 820 to pivot or rotate to different positions as needed.

In some aspects, a central mechanism, such as a servo or servo system, may control the angle of extension for each rotor arm 820. In some embodiments, the drone 800 may be stable at multiple configurations, such as those illustrated in FIGS. 8A-8D. A range of configurations may allow for mission-specific configurations. For example, the configuration of FIG. 8D may be effective for short distances to fly within scaffolding, and the configuration of FIG. 8B may be effective for inspecting drain pipes.

In some embodiments, the drone 800 may take an entirely different shape based upon the space the device needs to fit through. In some aspects, the rotor arms 820 may pivot in different directions based on the shape or size the drone 800 needs to take. In some implementations, different orientations or shapes that the drone 800 may be controlled manually, such as by remote control. In some embodiments, the drone 800 may comprise sensors that may detect objects around the device in order to reconfigure itself.

In some aspects, the drone 800 may reconfigure its rotors and rotor arms 820 based on the shape it takes as well. For example, such as illustrated in FIGS. 5A-5C, the rotor arms 820 may extend or retract to increase maneuverability. In some embodiments, the rotor arms 820 may fully retract inside the drone 800 for storage capabilities or even transportation of the drone 800. In some aspects, a mechanism may extend and retract the rotor arms 820, such as a servo, pulley system, or gears, as non-limiting examples.

Figure 9A:
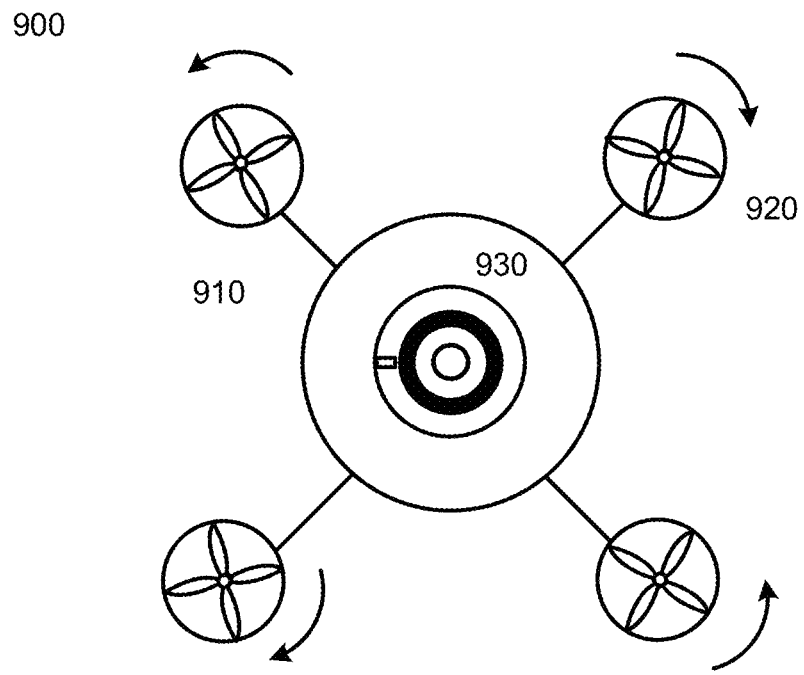
FIG. 9A illustrates a top down view of an exemplary drone with a hollow body, wherein the hollow body may comprise a central opening, according to some embodiments of the present disclosure.

Referring now to FIG. 9A, a top down view of an exemplary drone 900 with a hollow body 910 is illustrated, wherein the hollow body 910 may comprise a central opening. In some embodiments, the drone 900 may comprise rotor arms 920 that may extend from the hollow body 910, wherein their location may not impede the central opening. In some aspects, the hollow body 910 may allow for a camera 930 to be located near the central opening, wherein the central opening may allow for near 360° visibility.

Figure 9B:
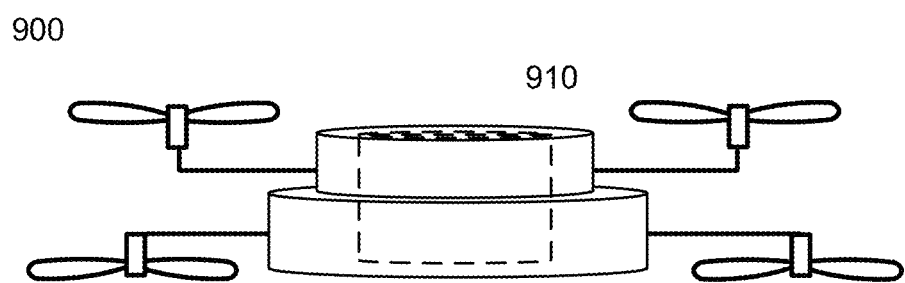
FIG. 9B illustrates a side view of an exemplary drone with a hollow body, wherein the hollow body may comprise a central opening, according to some embodiments of the present disclosure.

Referring now to FIG. 9B, a side view of an exemplary drone 900 with a hollow body 910 is illustrated, wherein the hollow body 910 may comprise a central opening. In some aspects, the drone 900 may be adjustable, wherein one or more rotor may change position. In some embodiments, at least a portion of the rotors may be able to rotate. In some implementations, rotors may be located on different planes of the hollow body 910, wherein the different planes may allow for stacked rotors when the drone 900 may be in a collapsed position.

In some aspects, the components of the drone 900 may be distributed throughout the hollow body 910 to balance the weight distribution. In some embodiments, the hollow body may allow for duplicate components as a means to create a balanced weight distribution, such as two power sources or two processing units. Though shown as a round shape, other shapes may be appropriate and functional. Though shown as a continuous shape, other configurations may be appropriate and functional. For example, a horseshoe shape may be effective.

Referring now to FIGS. 10A-10D, an exemplary hollow body 1020 for use with a drone is illustrated, wherein a central opening of the hollow body 1020 may increase a range of visibility 1040 for a camera 1030 installed on the hollow body 1020. In some implementations, the camera 1030 may comprise an omnidirectional camera. In some implementations, the camera 1030 may be able to pivot along an axis that may extend from the hollow body 1020. In some aspects, the camera may be stabilized with a gimbal, which may allow for stable filming. In some embodiments, the drone may be able to operate in any orientation, and a gimbal may allow the camera to point in a single direction regardless of orientation. The hollow body 1020 may allow for visibility in any orientation.

Referring now to FIGS. 11A-11E, an exemplary drone 1100 with central platform 1120 and ducted rotors 1110, 1115 is illustrated. In some aspects, the central platform 1120 may come in different shapes and variations. In some aspects, the shape of the central platform 1120 may depend on the designated use of the drone 1100. For example, the central platform may be in a square or rectangular shape if the drone 1100 is meant to carry things. In some aspects, the central platform 1120 may come in different sizes, again based on use, or user discretion. In some aspects, the size and shape of the central platform 1120 may affect the positioning of ducted rotors 1110, 1115. In some aspects, the rotors 1110, 1115 may be closer or further apart depending on the central platform 1120.

Figure 11A:
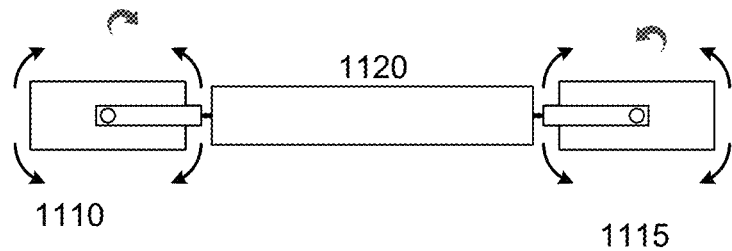
FIG. 11A illustrates a side view of an exemplary drone with central platform and ducted rotors, according to some embodiments of the present disclosure.
Figure 11B:
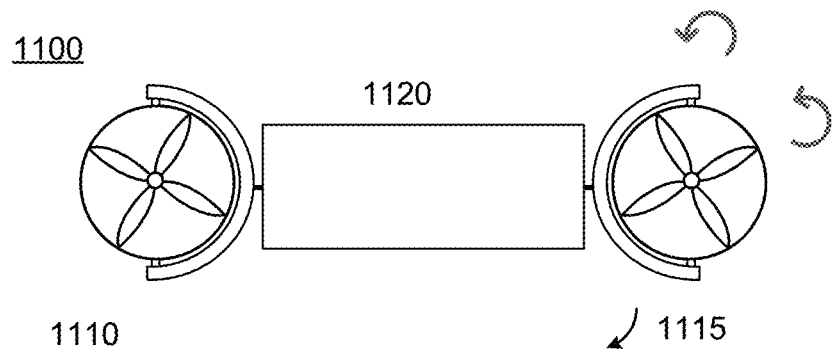
FIG. 11B illustrates a top down view of an exemplary drone with central platform and ducted rotors, according to some embodiments of the present disclosure.
Figure 11C:
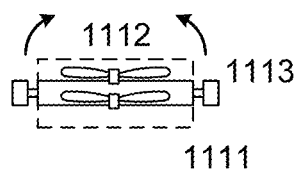
FIG. 11C illustrates a side view of an exemplary ducted rotor, according to some embodiments of the present disclosure.
Figure 11D:
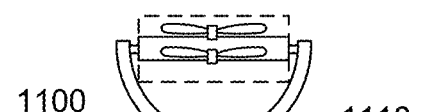
FIG. 11D illustrates a cross section of an exemplary central platform, according to some embodiments of the present disclosure.
Figure 11E:
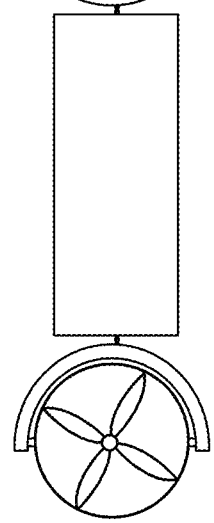
FIG. 11E illustrates a side view of a vertical orientation of an exemplary drone with central platform and ducted rotors, according to some embodiments of the present disclosure.

In some embodiments, the ducted rotors 1110, 1115 may have different cross sections depending on the type of ducted rotor 1110, 1115 being used on a drone 1100. In some embodiments, smaller ducted rotors 1110, 1115 may be used for a drone 1100 with a smaller central platform 1120. For example, the smaller the drone 1100 and central platform 1120 the smaller the ducted rotors 1110, 1115 may have to be because the device may not require as much airflow to navigate. In some embodiments, larger ducted rotors 1110, 1115 may be used for a bigger drone 1100. For example, the larger ducted rotors 1110, 1115 may have more cross section to provide a larger amount of airflow to lift bigger drones 1100 and central platforms 1120 off the ground. In some embodiments, as shown in FIG. 11D, a central platform 1120 may comprise an airfoil design that may increase efficiency during forward flight.

In some aspects, a central platform 1120 may be located between the ducted rotors 1110, 1115. In some implementations, a ducted rotor 1110 may comprise a system of rotors 1112 located within a duct 1111. In some embodiments, a ducted rotor 1110 may comprise a pivot mechanism 1113, which may allow for a shift in orientation for the drone 1100. In some implementations, the duct 1111 may comprise an airfoil cross section design that may be useful during forward flight.

In some aspects, the central platform 1120 may comprise the drone components, such as one or more of a power source, communication mechanism, control mechanism, and directional control mechanism. In some aspects, the ducted rotors 1110, 1115 may act as a directional control mechanism, wherein pivoting the ducted rotors 1110, 1115 may affect a direction of flight for the drone 1100.

In some embodiments, the central platform 1120 may comprise an airfoil shape that may provide lift in forward flight. In some aspects, the central platform 1120 may comprise one or more of ailerons, elevon, or tail structure that may aid in control during forward flight. In some embodiments, the design of the central platform 1120 may depend on the purpose of the drone 1100 and expected flight paths and patterns. For example, a drone 1100 configured primarily for vertical flight may not benefit from structures that make forward flight more efficient.

In some implementations, ducted rotors 1110, 1115 may pivot, allowing the central platform 1120 to rotate on three-hundred and sixty degrees. In some implementations, the pivoting may enable the ducted rotors 1110, 1115 to turn the drone 1100 in different directions. In some implementations, the full spin of the ducted rotors 1110, 1115 on the pivot system may allow for quick turns and a more agile turning radius overall. In some implementations, pivoting may allow for a wide range of orientations for the drone 1100, from a fully horizontal position to a fully vertical position, wherein the central platform 1120 may be located between the ducted rotors 1110, 1115 in any orientation.

In some aspects, the ducted rotors 1110, 1115 may comprise one or more rotors. In some aspects, the rotor blades may comprise a lightweight durable material that allows for maximum airflow through the ducted rotors 1110, 1115. For example, the rotor blades may comprise of plastic, aluminum, or silicone, as non-limiting examples. In some aspects, the materials of the ducted rotors 1110, 1115 may be based on use and use conditions.

In some embodiments, the drone 1100 may change orientation based on use or travel conditions. For example, where the drone 1100 may fly between narrow passes, a vertical orientation may allow for better maneuverability. Ducted rotors 1110, 1115 may allow for flight in narrow spaces, where bumping into walls or objects may have a reduced effect on the functionality of the ducted rotors 1110, 1115 with the protection of the duct 1111. In some implementations, the drone 1100 may change orientation if there is a malfunction or loss of power to a ducted rotor 1115, allowing the drone 1100 to continue travel or at least have a controlled landing.

In some aspects, a drone 1100 may be able to sustain flight even with the loss of one or more rotors. For example, the drone 1100 may change orientation and maintain flight with the loss of two rotors within a single ducted rotor 1115. As another example, the drone 1100 may sustain flight with the loss of a rotor within each ducted rotor 1110, 1115. In some aspects, a single rotor may allow for sustained flight or at least controlled descent in the event of complete loss of functionality for one ducted rotor 1115 and the loss of one rotor in the other ducted rotor 1110.

Figure 12A:
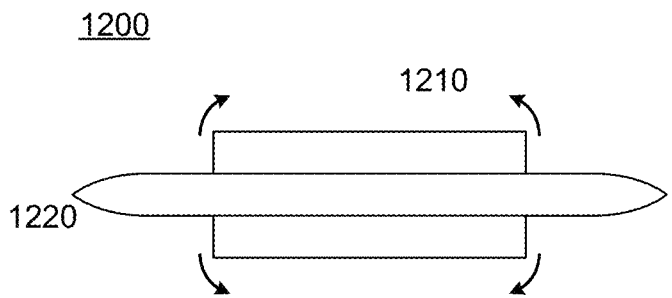
FIG. 12A illustrates a side view of an exemplary drone with central ducted rotor, according to some embodiments of the present disclosure.
Figure 12B:
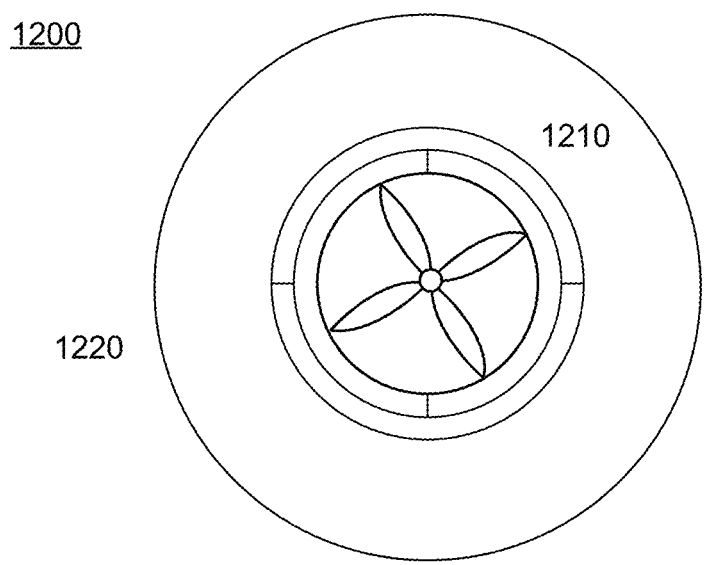
FIG. 12B illustrates a top down view of an exemplary drone with central ducted rotor, according to some embodiments of the present disclosure.
Figure 12C:
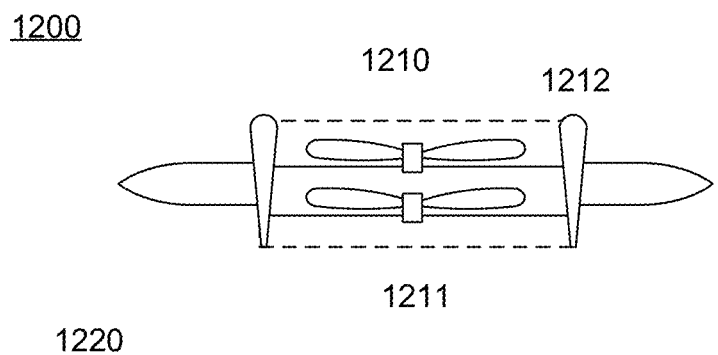
FIG. 12C illustrates a cross section view of an exemplary drone with central ducted rotor, according to some embodiments of the present disclosure.

Referring now to FIGS. 12A-12C, an exemplary drone 1200 with central ducted rotors 1210 is illustrated. In some aspects, the drone 1200 with central ducted rotors 1210 may have a movable duct 1212 in the center of the device to allow for different orientations of the ducted rotor 1210. In some aspects, the duct 1212 may allow the rotors 1211 to move in different directions while in flight. For example, the user may control the path of the flight using a remote-controlled device and the duct 1212 may pivot the rotors 1210 to turn the drone 1200 in the specific guided direction.

In some implementations, the duct may surround the rotors 1211 with an airfoil shape for efficient aerodynamics and fitment throughout the drone 1200. In implementations, the duct walls may be airfoil. In some implementations, the relative sizes and proportions of the duct 1212 may vary based on drone 1200 size, duct 1212 angle range or size, rotor 1211 size, body 1220 size, and expected flight conditions, and purpose of the drone 1200, as non-limiting examples. In some implementations, the duct 1212 may affect the airflow the rotors receive 1210 and the over aerodynamics of the drone 1200 itself. For example, the duct 1212 may be narrowed or widened for different sized surrounding bodies 1220 to allow for a better aerodynamic when the drone 1200 is in flight.

In some embodiments, the ducted rotors 1210 may have a body 1220, wherein the ducted rotors 1212 may be located centrally. In some embodiments, a ducted rotor 1210 may comprise gyro axes, which may allow for pivoting. In some aspects, gyro mechanism may allow for stable orientation of the ducted rotors 1210 regardless of the orientation of the body 1220. In some embodiments, the ducted rotors 1211 may be ducted differently for differently sized rotors 1211. In some aspects, the ducted rotors 1211 may be adjustable, wherein the ducted rotors 1211 may act as a directional control mechanism, wherein pivoting the ducted rotors 1211 may affect a direction of flight for the drone 1200

In some embodiments, the body 1220 may be various shapes and sizes depending on the ducted rotor 1210 and drone 1200 size. For example, bigger drones 1200 may have a larger body 1220 because they may require larger rotors 1210 to carry them off the ground and into the air. As another example, a drone 1200 that is likely to fly horizontally over long distances, the body 1220 may comprise an aerodynamic shape for horizontal flight, whereas a drone 1200 configured to fly to high altitudes may comprise an aerodynamic shape for vertical flight.

Figure 13:
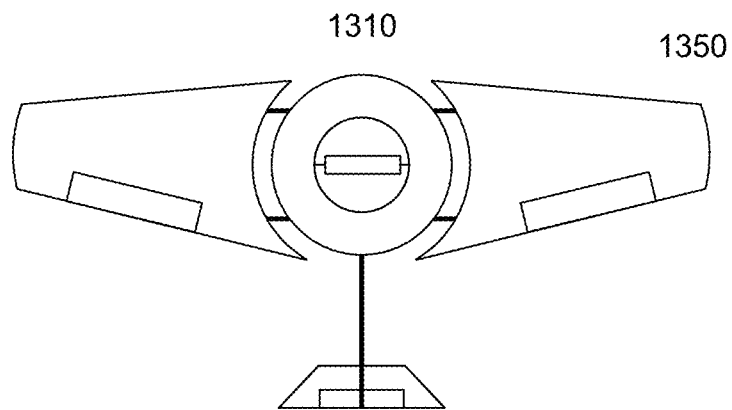
FIG. 13 illustrates an exemplary drone with central ducted rotor and wings, according to some embodiments of the present disclosure.

Referring now to FIG. 13, an exemplary drone 1300 with central ducted rotors 1310 and wings 1350 is illustrated, wherein the ducted rotors 1310 are tilted in the forward flight position. In some embodiments, the ducted rotors 1310 may rotate, such as depending on an expected flight path, which may determine the need for lift and propulsion. In some aspects, the drone 1300 with wings 1350 may come with variations of the wing sets to propel the drone. In some aspects, the wings 1350 may have modular extensions to control the length and deployment of the wings, wherein the modular extensions may be attached to the body of the drone 1300.

For example, the modular extensions may deploy the wings 1350 inside and outside the drone 1300. In some aspects, the wings 1350 may detach from the modular extensions and the drone 1300 to be maintained, cleaned, or used for a purpose that may not require or benefit from wings, as non-limiting examples. In some aspects, the modular extensions may be for specific uses only, rather than a permanent feature on the drone 1300. For example, the modular extensions may only be used for longer flights or stronger winds to maintain the strength of the wings 1350.

In some aspects, the wings 1350 may come in different shapes and sizes that can be used for different flights and uses. In some aspects, the wings 1350 may be modified by folding flaps, adjusting the modular extensions, or retracting portions as non-liming examples that may adjust a configuration or size of the wings 1350. In some aspects, different size wings 1350 may attach to the same modular extensions for different uses. In some aspects, the modular extensions may be moved around the outside of the drone 1300 to allow for different placement of the wings 1350.

In some embodiments, the drone 1300 with wings 1350 may come with a detachable tail that aids in flight. In some embodiments, the tail may control the turning radius and overall flight pattern of the drone 1300 when in flight. For example, the tail may conform to the wind and balance the drone 1300 when in flight through different wind patterns, conditions, and climates. In some embodiments, the tail may be removed separately from the rest of the wings 1350 from the modular extensions. In some aspects, the wings 1350 may act as part of a directional control mechanism, wherein the wings 1350 may affect a direction of flight for the drone 1300.

Figure 14A:
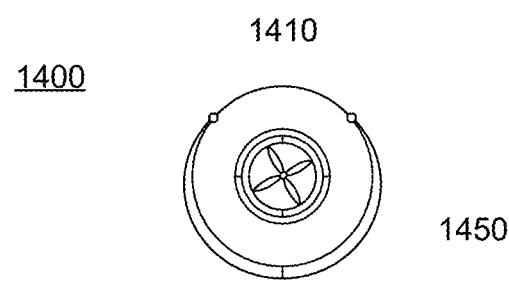
FIG. 14A illustrates an exemplary drone with central ducted rotor and collapsible wings, wherein the wings are in a collapsed position.
Figure 14B:
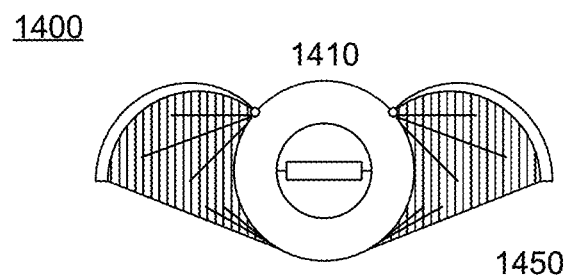
FIG. 14B illustrates an exemplary drone with central ducted rotor and collapsible wings, wherein the wings are in an expanded position and the central ducted rotor is oriented for forward flight.

Referring now to FIG. 14A, an exemplary drone 1400 with central ducted rotors 1410 and collapsible wings 1450 is illustrated, wherein the collapsible wings 1450 are collapsed. Referring to FIG. 14B, an exemplary drone 1400 with central ducted rotors 1410 and collapsible wings 1450 is illustrated, wherein the collapsible wings 1450 are expanded and the central ducted rotors 1410 are oriented for forward flight. In some implementations, the drone 1400 may come as a variation with collapsible wings 1450. In some implementations, the collapsible wings 1450 may be connected to a mechanism that allows the wings to be retracted into the drone 1400 and deployed for flight. In some implementations, the collapsible wings 1450 may be attached to pivots which help the wings 1450 rotate inside and out of the drone 1400. In some aspects, the wings 1450 may be controllable and may act as part of a directional control mechanism, wherein the wings 1450 may affect a direction of flight for the drone 1400.

In some embodiments, the collapsible wings 1450 may enable the drone 1400 to travel or easily stored. For example, when the wings 1450 have been collapsed inside the drone 1400 it may then be stored in a smaller area than if the wings 1450 were not collapsible. In some examples, the collapsible wings 1450 may make traveling with the drone 1400 much easier because it may then fit under seats, slid into a car trunk easier, or fit into a duffle bag, as non-limiting examples.

In some aspects, the collapsible wings 1450 may have a fabric that acts as a webbing or netting on the inside of the wings 1450 to help with flight and function. In some embodiments, the fabric may help with collapsing and deploying the wings 1450. For example, the fabric may stretch and help with fluidity of the pivots or extending mechanism when using the wings 1450. In some aspects, the fabric may help the drone 1400 with flight patterns and overall improve the aerodynamics of the wings 1450. In some aspects, the wings 1450 may be attached to an arm extender mechanism that helps deploy and collapse the wings.

In some aspects, the arm extender may adjust the wings 1450 during flight to help with different weather conditions and wind speeds. In some implementations, the wings 1450 may be deployed mid-flight, such as if the ducted rotor 1410 loses power or the drone 1400 shift mid-flight to a pattern that would benefit from wings 1450. In some embodiments, the wings 1450 may be deployed or stored prior to flight, wherein the collapsed or expanded position of the wings 1450 may be static during flight. In some aspects, the wings 1450 may be deployed in response to or in conjunction with a change in orientation of the central ducted rotor 1410 for forward flight.

Figure 15A:
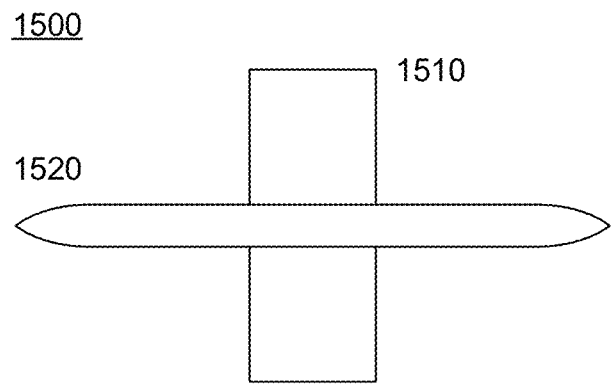
FIG. 15A illustrates a side view of an exemplary drone with central ducted rotor, wherein the rotors are vertically oriented.
Figure 15B:
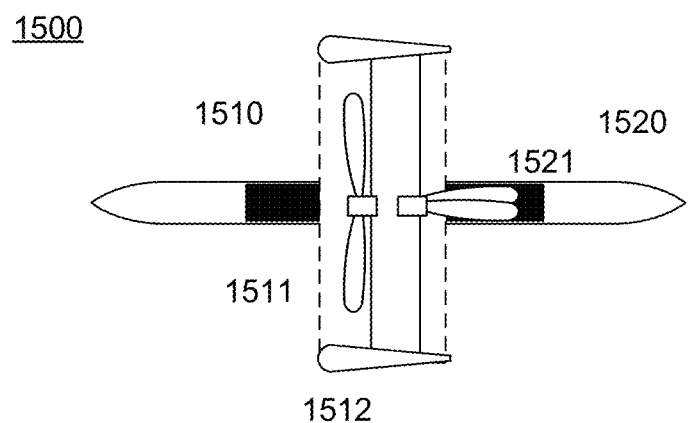
FIG. 15B illustrates a side view of an exemplary drone with central ducted rotor, wherein the rotors are vertically oriented.

Referring now to FIGS. 15A-15B, an exemplary drone 1500 with central ducted rotors 1510 is illustrated, wherein the ducted rotors 1510 may be oriented in a vertical position. In some embodiments, a drone 1500 may comprise a rotatable duct 1512, wherein the rotors 1511 may be oriented vertically or horizontally, such as illustrated in FIGS. 12A-12B. In some aspects, the ducted rotor 1510 may pivot within a cavity 1521 within the body 1520. In some implementations, the drone 1500 with central ducted rotors 1510 may be used for different purposes and in different weather conditions.

In some implementations, the duct 1512 may be oriented horizontally (such as illustrated in FIG. 12A) at the start of a flight to allow for efficient lift, and the duct 1512 may be turned ninety degrees when the drone 1500 enters horizontal flight for more effective propulsion. In some embodiments, a resting position of the drone 1500 may comprise a horizontal orientation for the ducted rotors 1510. In some implementations, a vertical orientation may allow for efficient horizontal flight, which may be helpful where a drone 1500 may need to travel long distances, such as for agriculture or industrial power and communication projects.

In some aspects, in a vertical orientation, multiple rotors 1511 may reduce efficiency and effectiveness of flight. At least a portion of the rotors 1511 may collapse or fold away in a vertical orientation. In some aspects, the vertical orientation may make the drone 1500 more aerodynamic for horizontal flight and the flight control may be more accurate and responsive. In some implementations, the orientation of the ducted rotors 1510 act as part of a directional control mechanism, wherein the orientation may affect a direction of flight for the drone 1500.

In some embodiments, the central ducted rotors 1510 may allow for easier access to the propeller and internal components. In some embodiments, the rotors 1511 may be folded back when the drone 1500 is not in flight for easier travel or storage. In some aspects, the propeller may fold back and forth during flight to help with battery consumption and overall weight distribution when the drone 1500 is carrying a load. In some aspects, the centralized ducted rotors 1510 may be more efficient when carrying a load. For example, the centralization of the rotors may distribute the weight of a load throughout the drone 1500.

Figure 16A:
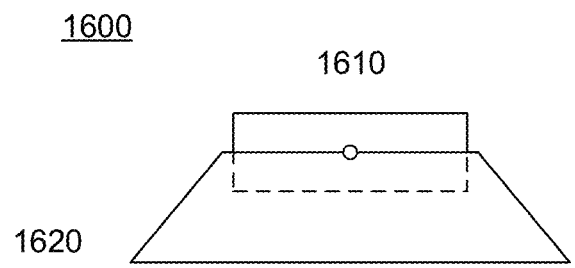
FIG. 16A illustrates a side view of an exemplary drone with titling ducted rotors, according to some embodiments of the present disclosure.
Figure 16B:
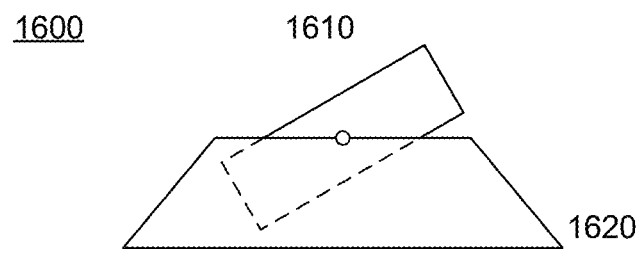
FIG. 16B illustrates a side view of an exemplary drone with titling ducted rotors, according to some embodiments of the present disclosure.
Figure 16C:
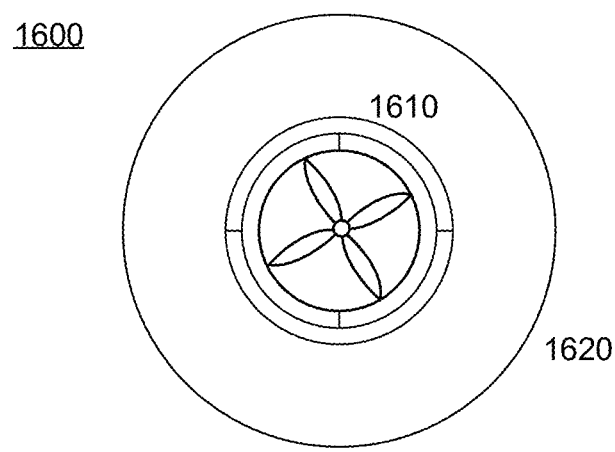
FIG. 16C illustrates a top down view of an exemplary drone with titling ducted rotors, according to some embodiments of the present disclosure.

Referring now to FIGS. 16A-16C, an exemplary drone 1600 with titling ducted rotors 1610 are illustrated. In some implementations, the drone 1600 with central tilting ducted rotors 1610 may be used for smaller more agile drones 1600. In some implementations, the tilting ducted rotors 1610 may have a default orientation when the drone 1600 is not in use or at rest. In some implementations, the ducted rotors 1610 may rotate as a system within the body 1620.

In some aspects, the ducted rotors 1610 may tilt separately, such as where rotors may tilt separately from the duct. Where the duct and rotors tilt separately, they may be controlled independently or dependently. In some embodiments, the duct may be angled in different directions to allow for the ducted rotors 1610 to tilt in different directions or angles based on the angle the duct. In some implementations, angle of the ducted rotors 1510 may act as part of a directional control mechanism, wherein the angle of one or both of the rotors and the duct may affect a direction of flight for the drone 1600. In some aspects, a tilting mechanism may be attached to the body 1620.

Figure 17A:
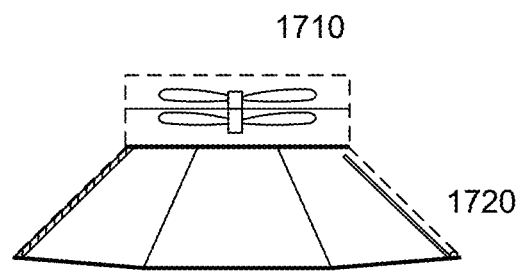
FIG. 17A illustrates a side view of an exemplary drone with ducted rotors, wherein the drone may comprise an expandable landing mechanism in a collapsed orientation.
Figure 17B:
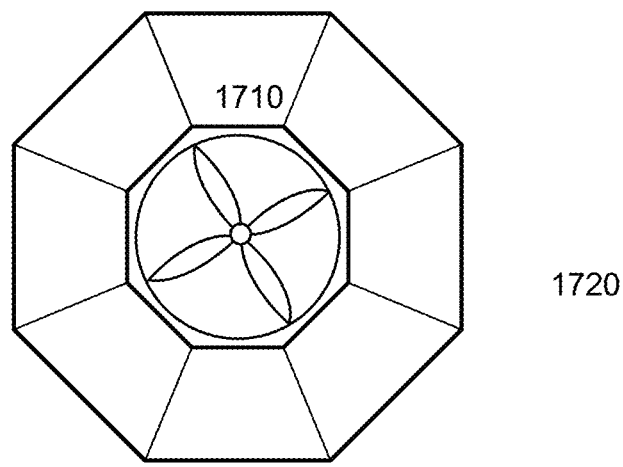
FIG. 17B illustrates a top down view of an exemplary drone with ducted rotors, wherein the drone may comprise an expandable landing mechanism.
Figure 17C:
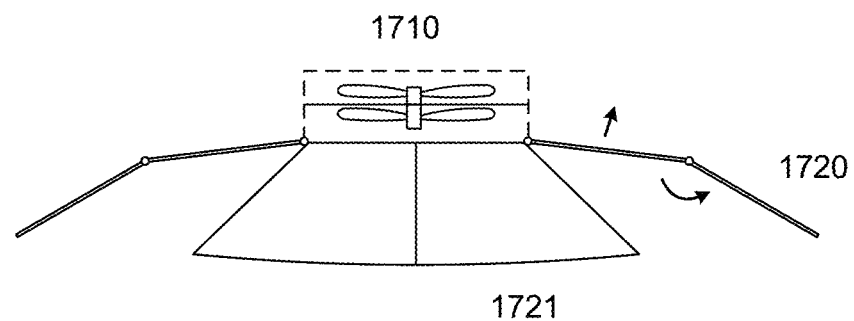
FIG. 17C illustrates a side view of an exemplary drone with ducted rotors, wherein the drone may comprise an expandable landing mechanism in an expanded orientation.
Figure 17D:
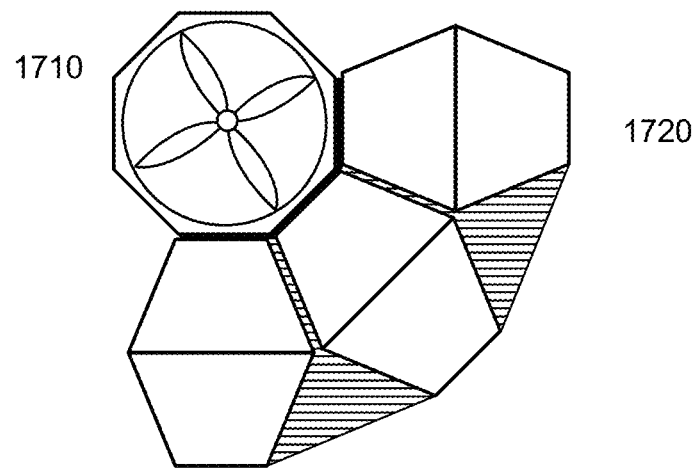
FIG. 17D illustrates a partial top down view of an exemplary drone with ducted rotors, wherein the drone may comprise an expandable landing mechanism in an expanded orientation.

Referring now to FIGS. 17A-17D, an exemplary drone 1700 with ducted rotors 1710 is illustrated, wherein the drone 1700 may comprise an expandable landing mechanism 1720. Referring to FIG. 17D, an exemplary drone 1700 with a partial deployment is illustrated. In some embodiments, the expandable landing mechanism 1720 may deploy in an emergency, such as ducted rotor 1710 failure. In some aspects, the drone 1700 with the expandable landing mechanism 1720 may comprised of an expandable material or durable material. For example, the expandable landing mechanism 1720 may comprise an aluminum, plastic, silicone, or fabric, as non-limiting examples. In some aspects, the landing mechanism 1720 may comprise connective material that may allow for an effective gliding path, such as may occur during ducted rotor 1710 failure. In some embodiments, the material of the expandable landing mechanism 1720 may depend on the purpose of the drone 1700, the expected terrain, expected conditions, or user preference, as non-limiting examples.

For example, where a drone 1700 may be configured for flight over a mountainous terrain, the expandable landing mechanism 1720 may comprise a durable and flexible material that may not be damaged easily by sharp objects and rocky conditions. As another example, where a drone 1700 may be configured for flight in very windy conditions, the expandable landing mechanism 1720 may comprise a material or configuration that limits the impact of wind currents. The expandable landing mechanism 1720 may allow for easy passage of air flow with limited collection, as heavy winds may dramatically affect a passive emergency landing.

In some aspects, a panel for an expandable landing mechanism 1720 may be a hexagonal shape that may fold out from a four-sided panel. In some implementations, an expandable landing mechanism 1720 may comprise an octagonal shape surrounding the ducted rotors 1710, wherein each side of the octagonal shape may comprise a foldable panel. In some embodiments, the expandable landing mechanism 1720 may expand into an upward position, wherein the ends of the expandable landing mechanism 1720 may be located above the ducted rotors 1710. This configuration may allow for a controlled descent. In some embodiments, the expandable landing mechanism 1720 may connect to a frame 1721 extending from the ducted rotors 1710. In some aspects, a drone 1700 may comprise walled, wired, or both frames 1721. Wire frames may allow for the expandable landing mechanism 1720 to provide a larger portion of the drag and directional control during landing than would walled frames 1721.

In some aspects, the landing mechanism 1720 may be fully collapsible inside the drone 1700 when not in use. For example, when the drone 1700 is in flight the expandable landing mechanism 1720 may retract up into the drone 1700 to prevent extra drag when in flight mode. In some aspects, the landing mechanism 1720 may be comprised of different joints throughout the mechanism to allow for more fluid movement when being deployed or retracted from the drone 1700. In some implementations, the expandable landing mechanism 1720 may act as a parachute, such as during an emergency landing.

In some embodiments, the landing mechanism 1720 may allow for low power descent for a drone 1700, which may allow for extended vertical flight. A drone 1700 may comprise a limited power source that may define the limitations of functionality and flight. For example, where a drone 1700 may be configured to collect visual data for large buildings, the area and amount of data collected may be based in part on the power source. A landing mechanism 1720 may allow for reduced power requirements for a safe and controlled landing, which may allow for allocation of that power to increase the area covered or data collected in each flight. In some aspects, deployment of the landing mechanism 1720 may be manual, automatic, or both.

In some implementations, the landing mechanism 1720 may comprise two layers of material to provide extra durability and strength for harder landings, such as onto rocky or frozen terrain. In some implementations, both layers may comprise the same or different material. In some implementations, the landing mechanism 1720 may be used for emergencies only when triggered by the drone 1700 or the user. For example, the drone 1700 may sense that it needs to perform an emergency landing and then the landing mechanism 1720 may then be deployed to slow descent and allow for a safer landing.

In some aspects, the landing mechanism 1720 may have a flotation device which may allow for the drone 1700 to land in different bodies of water without ruining the internal components or damaging the drone 1700. In some embodiments, the landing mechanism 1720 may comprise different expandable panels that allow for a more flexible landing. In some aspects, the panels may have material in between them that allow for flexibility and expandability. For example, an elastic fabric may be placed inside each of the panels that allows the landing mechanism 1720 to flex and conform to landing environments. In some implementations, a webbing between panels may allow for a safer and slower descent.

In some embodiments, the landing mechanism 1720 may be attached to the rotors 1710 as shown in the figure. For example, the landing mechanism's 1720 base may be connected to the ducts of the rotors 1710 or to the body of the drone 1700. In some aspects, the landing mechanism 1720 may be detachable, which may allow for removal from the drone 1700 when not in use, for maintenance, or cleaning.

In some embodiments, the landing mechanism 1720 may comprise a deployment mechanism that may trigger release of the landing mechanism 1720. For example, a clip or clips may keep the landing mechanism 1720 in the folded position, and a triggering event may release those clips. Where the triggering event may comprise a loss in power, the clips may be maintained electronically, and a loss of power to the ducted rotors 1710 may mean a loss in power for the clips, triggering a release of the landing mechanism 1720. In some aspects, the deployment mechanism may comprise memory wire, where a small electric charge causes the wire to maintain a predefine position. Power loss may cause the memory wire to shift to a resting position that may release or control the landing mechanism 1720. In some aspects, the deployment mechanism may be triggered through electronic control, such as by a user.

Figure 18A:
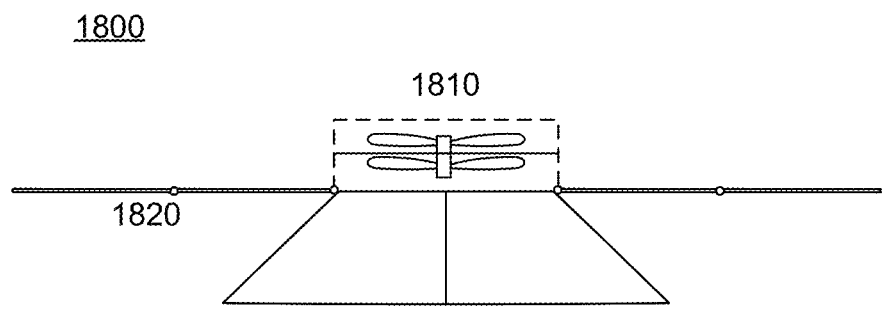
FIG. 18A illustrates a side view of an exemplary drone with ducted rotors is illustrated, wherein the drone may comprise an expandable landing mechanism.
Figure 18B:
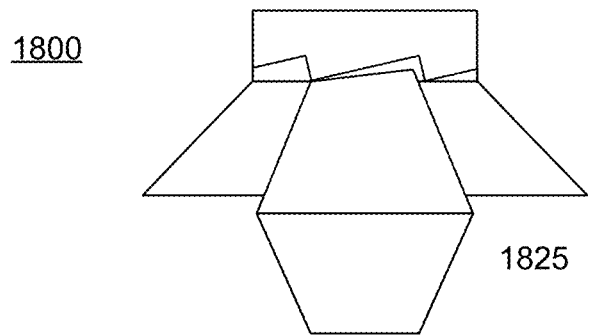
FIG. 18B illustrates a partial side view of an exemplary drone with ducted rotors is illustrated, wherein the drone may comprise an expandable landing mechanism.

Referring now to FIGS. 18A-18B, an exemplary drone 1800 with ducted rotors 1810 is illustrated, wherein the drone 1700 may comprise an expandable landing mechanism 1820. In some aspects, the expandable landing mechanism 1820 may comprise hinged panels that may release for landing. In some aspects, the expandable landing mechanism 1820 may comprise a series of rigid or semi-rigid panels, wherein each panel may be connected in an angled position that may allow for air flow through the panels. The angled positions may allow the expandable landing mechanism 1820 to act in a windmill fashion creating drag to slow the descent of the drone 1800.

In some embodiments, the expandable landing mechanism 1820 may have an angled positioning that may allow air flow across the panels during a fall. For example, the landing mechanism 1820 may be at a forty-five degree angle that may slow descent of the drone 1800, allowing for a more controlled landing. In some embodiments, this variation may have expanding landing panels 1825 that fold in and out when the drone 1800 is preparing to land, wherein deployment of the expanding landing panels 1825 may occur manually or automatically. In some implementations, the expandable landing mechanism 1820 may deploy in an emergency situation and slow the descent of the drone 1800.

For example, deploying the expanding landing panels 1825 may cause them to rotate in a pinwheel or windmill fashion. In some aspects, the landing panels 1825 may cause the entire drone 1800 to rotate during descent. In some embodiments, the landing panels 1825 may be attached to spinnable ring, wherein a rotation of the expandable landing mechanism 1820 may not rotate the entire drone 1800.

In some aspects, more than one landing panel 1825 may be implemented at once so that the drone 1800 always lands on a flat surface. For example, the drone 1800 may land on an uneven surface and the landing panels 1825 may sense this and fold out so that the drone 1800 levels out onto a flat surface. In some aspects, this may prevent the drone 1800 from tipping over and avoiding damage to the inside or outside components if the device were to fall.

In some embodiments, landing panels 1825 may be controlled separately, which may allow for different configurations based on the landing conditions. For example, where the drone 1800 may be located over a body of water, landing panels 1825 may be deployed in a configuration that may allow for extended gliding for horizontal distance. As another example, where the drone 1800 may be flying within a ravine or structure, landing panels 1825 may be deployed in a configuration that may allow for a primarily vertical descent to avoid collision.

Figure 19:
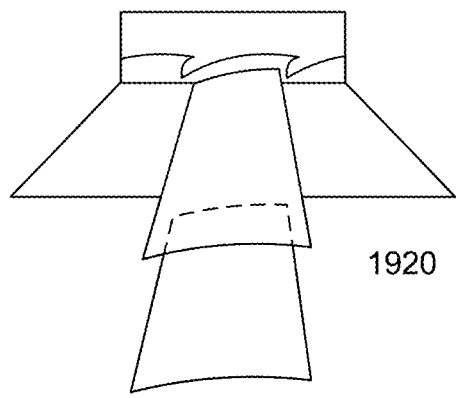
FIG. 19 illustrates a partial side view of an exemplary drone with ducted rotors is illustrated, wherein the drone may comprise an expandable landing mechanism.

Referring now to FIG. 19, an exemplary drone 1900 with ducted rotors is illustrated, wherein the drone 1900 may comprise expandable landing panels 1920. In some aspects, the expandable landing panels 1920 may retract into itself when not in use. In some embodiments, the drone 1900 with expandable landing mechanism 1920 may be used only when the drone 1900 is landing rather than being deployed before landing. For example, the expandable landing panel 1920 may deploy immediately before the drone 1900 lands. In some embodiments, the expandable landing panel 1920 may retract up into the drone 1900 with expandable mechanism 1920 after the drone 1900 has landed and has been secured.

In some aspects, this alternate design may simply be an extension method from the base of the drone 1900. For example, the landing mechanism 1920 and the expandable landing panel 1920 may both expand and retract at the same time when the drone 1900 is either taking off or beginning to land. In some embodiments, the expandable landing panel 1920 may extend even further out than other landing mechanisms to prevent further damage to the drone. For example, if the drone 1900 needs to land in a deeper body of water then the expandable landing panel 1920 may be used to keep the drone 1900 above the body of water, preventing water damage or submergence.

Figure 20A:
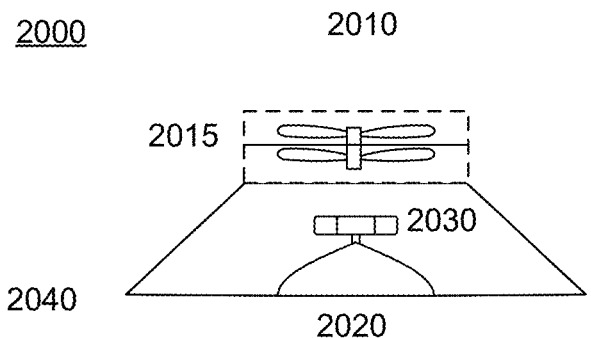
FIG. 20A illustrates a side view of an exemplary drone with ducted rotors, wherein flight path of the drone may be controllable through a control vane.
Figure 20B:
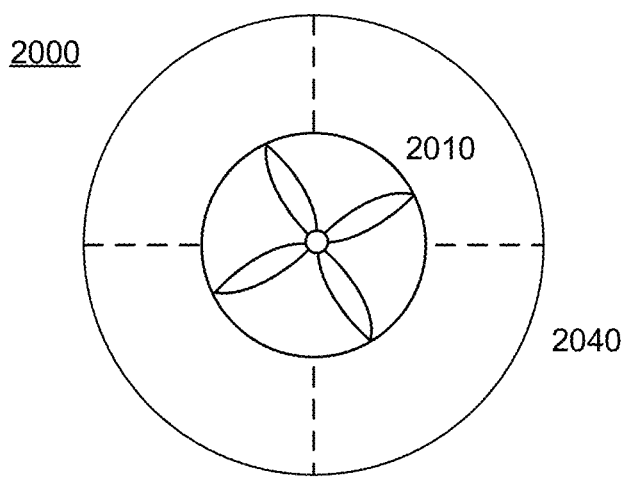
FIG. 20B illustrates a top down view of an exemplary drone with ducted rotors, wherein flight path of the drone may be controllable through a control vane.
Figure 20C:
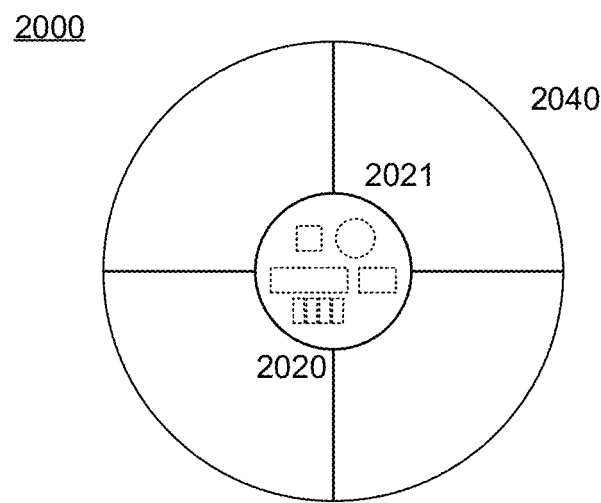
FIG. 20C illustrates a bottom up view of an exemplary drone with ducted rotors, wherein flight path of the drone may be controllable through a control vane.

Referring now to FIGS. 20A-20C, an exemplary drone 2000 with ducted rotors 2010 is illustrated, wherein flight path of the drone 2000 may be controllable through a control vane 2030. In some implementations, the control vane 2030 may act as a directional control mechanism, wherein the position of the control vane 2030 may affect a direction of flight for the drone 2000. In some aspects, the control vane 2030 may be moved and shifted to direct airflow from the rotors 2010, which may allow for directional control of the drone 2000. In some implementations, the flight path of the drone 2000 with ducted rotors 2010 may be controlled from the control vane 2030. In some embodiments, the control vane 2030 may comprise at least one panel that may direct airflow, such as illustrated in FIG. 7C. Different shaped control vanes 2030 may provide different levels and types of control.

In some aspects, the drone 2000 may be controlled manually, such as from a smart device or remote control. In some embodiments, flight of the drone 2000 may be preprogrammed as control instructions. In some aspects, the control vane 2030 may be located on the interior of the drone 2000 away from the outside elements to keep it from letting get damaged or destroyed.

In some aspects, the equipment throughout the drone 2000 may have a housing 2020 that protects the components of the drone 2000 from damage that may occur to the rest of the drone 2000. In some aspects, the housing 2020 may also help keep all the equipment organized in a neat fashion rather than spread out throughout the drone 2000 leaving it to be damaged. In some aspects, the housing 2020 may be removed and placed in other areas of the drone 2000. For example, the housing 2020 may need to be moved to another spot inside the drone 2000 because different components have been added, the user may then move the housing 2020 wherever fits best.

In some implementations, the housing 2020 may contain drone components 2021. In some embodiments, drone components 2021 may comprise one or more of a power source for providing drone power, control mechanism for controlling at least one feature of the drone 2000, communication mechanism for one or both internal and external communication, one or more memory resources for storing one or more instructions, collected data, and drone 2000 data, as non-limiting examples. In some implementations, drone components 2021 may be distributed through the drone 2000, such as on the outer body 2040, within the housing 2020, and on the ducted rotors 2010. In some aspects, the drone 2000 may be configured for a predefined functionality, such as collecting data or capturing media, wherein the drone 2000 may comprise additional components that allow for execution of the predefined functionality, such as a camera or GPS mechanism.

In some embodiments, the ducted rotors 2010 may be directly above the housing 2020 so that the equipment can be closely attached to the ducted rotors 2010. In some embodiments, the ducted rotors 2010 may be located at the top of the drone 2000 for effective flight usage and aerodynamics. In some embodiments, the control vane 2030 may be located between the housing 2020 and the ducted rotors 2010 for easy access during maintenance or repair. For example, if the control vane 2030 malfunctions then the ducted rotors 2010 may then be removed and the user can then reach directly into the drone 2000 to access the control vane 2030.

In some implementations, the outer body 2040 may comprise different materials and include different features. In some implementations, the outer body 2040 may be equipped with solar film to help with battery charging. For example, the solar film coating on the outer body 2040 may be connected to the battery charging system and help keep the battery charged when in sunlight.

In some implementations, the duct 2015 may hold more than one rotor 2010. For example, the duct 2015 may hold two rotors 2010 in parallel. In some aspects, there may exist different orientations of the rotors 2010 inside the duct 2015. For example, a staggered orientation of the rotors 2010 may be useful in some conditions. In some embodiments, the rotors 2010 may include a redundancy, which may allow for continued flight if there is a failure for one of the rotors 2010.

Figure 21:
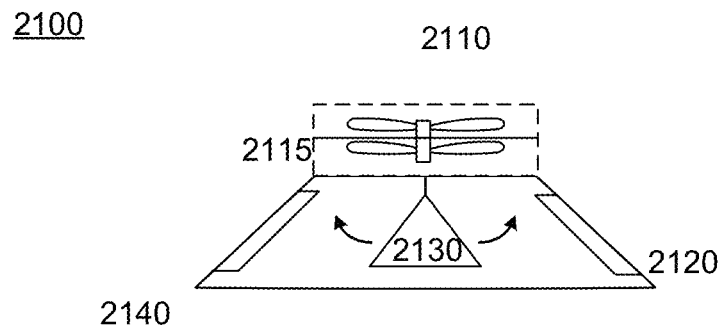
FIG. 21 illustrates a side view of an exemplary drone with ducted rotors, according to some embodiments of the present disclosure.

Referring now to FIG. 21, an exemplary drone 2100 with ducted rotors 2110 is illustrated, wherein the drone 2100 may be controllable through a control cone 2130 that may direct airflow from the duct 2115. In some implementations, the control cone 2130 may act as a directional control mechanism, wherein the position of the control cone 2130 may affect a direction of flight for the drone 2100. In some aspects, the control cone 2130 may be controlled from a remote device such as a smart device or remote control, as non-limiting examples. In some aspects, the control cone 2130 may hang from the top of the drone 2100 proximate to the ducted rotors 2110, which may allow for effective control of a significant portion of airflow. In some implementations, the control cone 2130 may connect to the body 2140, such as for directional control, stability, or protection, as non-limiting examples.

In some embodiments, the control cone 2130 may be shifted back and forth based on the drone's 2100 movement throughout the air. For example, the control cone 2130 may be shifted left to turn the drone 2100 right. In some implementations, the control cone 2130 may be placed in other areas of the drone 2100 that may allow for airflow control. In some embodiments, the control cone 2130 may be partially located within the duct 2115, which may initiate control immediately after passing through rotors.

In some aspects, components for the drone 2100 may be located in one or more locations, such as within the control cone 2130, outer housing 2120, or within the duct 2115. Location of the components may depend on efficiencies associated with the drone 2100, such as weight restrictions, weight distribution requirements, distribution of power requirements, drone 2100 functionality, materials, and flight conditions, as non-limiting examples.

Figure 22A:
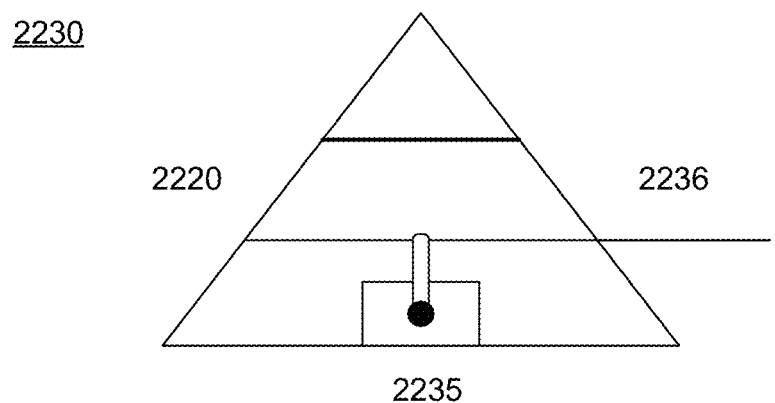
FIG. 22A illustrates a side view of an exemplary control cone for a drone with ducted rotors, according to some embodiments of the present disclosure.
Figure 22B:
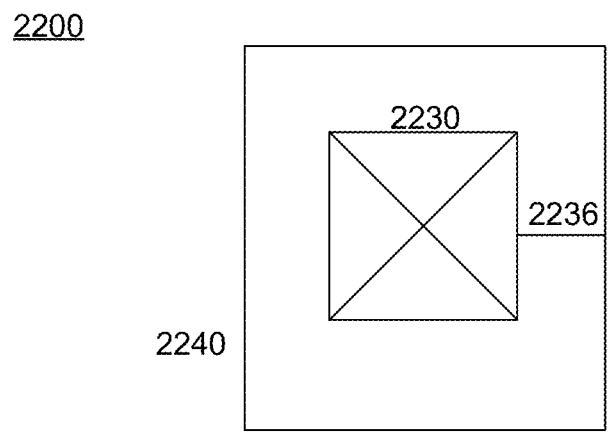
FIG. 22B illustrates a bottom up view of an exemplary drone with ducted rotors, according to some embodiments of the present disclosure.

Referring now to FIG. 22A, an exemplary control cone 2230 for a drone 2200 with ducted rotors is illustrated. Referring now to FIG. 22B, a bottom up view of an exemplary drone 2200 with ducted rotors is illustrated, wherein a control cone 2230 may direct airflow from the duct. In some embodiments, the control cone 2230 may act as a directional control mechanism, wherein the position of the control cone 2230 may affect a direction of flight for the drone 1500. In some aspects, the control cone 2230 may comprise a pyramid shape. In some embodiments, the control cone 2230 may comprise housing 2220 for electronic components of the drone 2200. In some implementations, the control cone 2230 may comprise a direction mechanism 2235 that may control the movement of the control cone 2230.

In some aspects, the direction mechanism 2235 may comprise a device that may manipulate a connection 2236 with the outer body 2240 of the drone 2200, pulling or pushing the control cone 2230. For example, the device may comprise a servo or rotating, electric spool. The connection 2236 may comprise a wire, rod, spring, or fabric as non-limiting examples. In some embodiments, the connection 2236 may comprise a bendable, elastic, or expandable material or configuration that may allow for different lengths and effective control of the control cone 2230. For example, a rigid connection 2236 may be telescoping.

In some aspects, the control cone 2230 may comprise housing 2220 for components located on the interior of the cone, which may protect the components and maintain a centralized weight distribution. In some aspects, the housing 2220 for electronics may prevent the electrical components from getting tangled or unplugged while the control cone 2230 is swinging around. In some aspects, the control cone 2230 may not be limited to a cone shape but may be produced in a square shape as shown in FIG. 22B, however, these may not be the only limiting shapes that the device may be produced in.

In some implementations, the direction mechanism 2235 may be located on the interior of the control cone 2230 as well. In some implementations, the direction mechanism 2235 may control a wire, line, rod or other non-limiting examples that may be attached to the outer body. In some implementations, the direction mechanism 2235 may allow the control cone 2230 to shift in multiple directions using the line, rod, wire, etc., connected to outer body. In some implementations, the control cone 2230 may have a hinge located on the inside of the device that allows the control cone 2230 to be stagnant or still while not in use. In some aspects, the hinge may allow the control cone 2230 to be placed on the inside of the drone 2200 when in storage or in travel. For example, the hinge may keep the control cone 2230 in place while the drone 2200 is being moved around or sliding around, keeping the control cone from being damaged or destroyed.

In some embodiments, an outer body 2240 may comprise a shape conducive to the functionality and expected flight conditions of the drone 2200. For example, a shape for a drone 2200 configured for speed may be different than a shape for a drone 2200 configured for slow flight for precise application or measuring. A drone 2200 configured for speed may comprise an airfoil shape, wherein horizontal flight may orient the airfoil for efficient flight. A drone 2200 configured for precision may comprise a rectangular frame with limited surface area that may be affected by wind currents.

Figure 23:
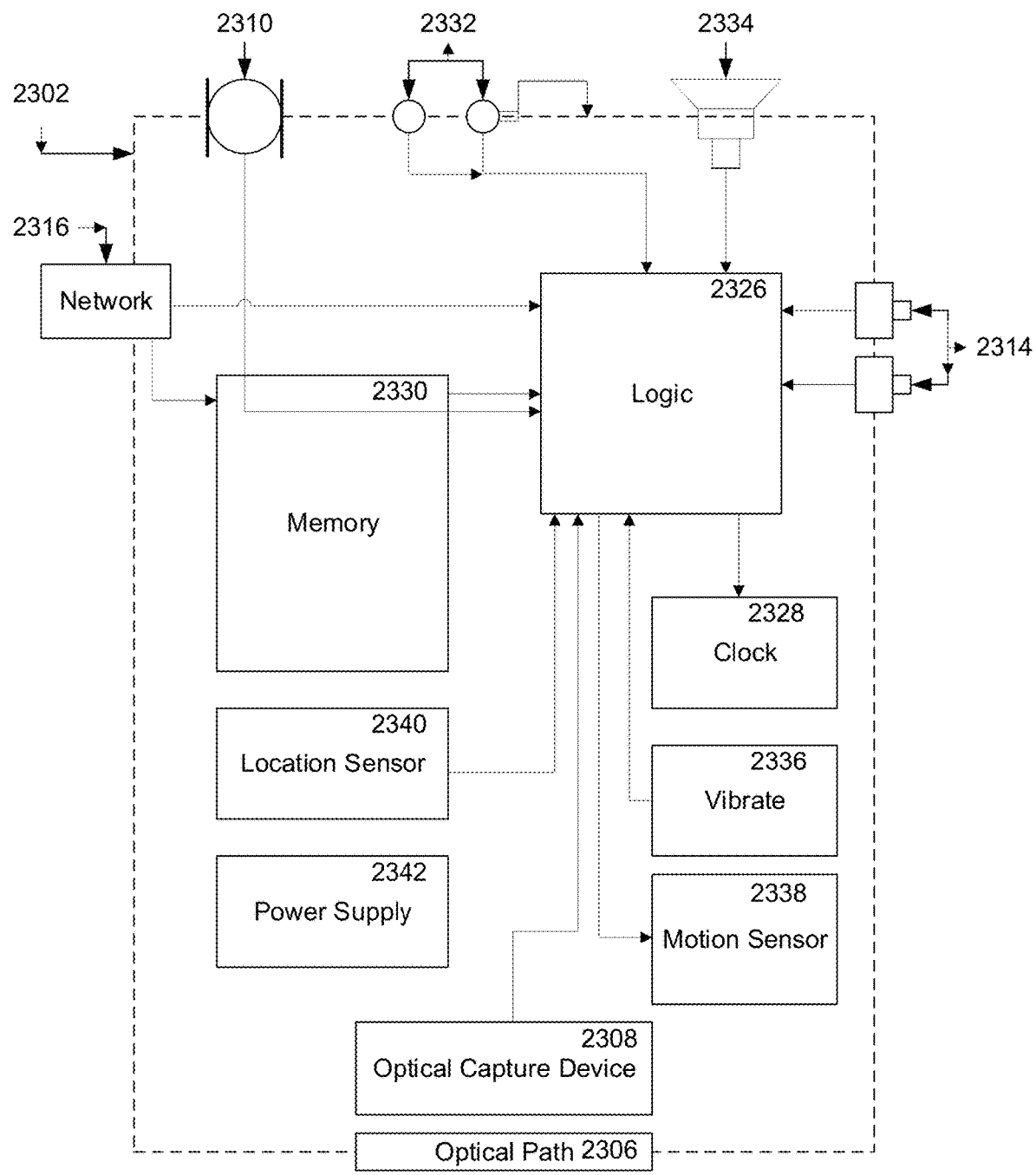
FIG. 23 illustrates a block diagram of an exemplary embodiment of a drone, according to some embodiments of the present disclosure.

Referring now to FIG. 23, a block diagram of exemplary components of a drone 2302 is illustrated. The drone 2302 may comprise an optical capture device 2308, which may capture an image and convert it to machine-compatible data, and an optical path 2306, typically a lens, an aperture, or an image conduit to convey the image from the rendered document to the optical capture device 2308. The optical capture device 2308 may incorporate a Charge-Coupled Device (CCD), a Complementary Metal Oxide Semiconductor (CMOS) imaging device, or an optical sensor of another type.

In some embodiments, the drone 2302 may comprise a microphone 2310, wherein the microphone 2310 and associated circuitry may convert the sound of the environment, including spoken words, into machine-compatible signals. Input facilities 2314 may exist in the form of buttons, scroll-wheels, or other tactile sensors such as touch-pads. In some embodiments, input facilities 2314 may include a touchscreen display. Visual feedback 2332 to the user may occur through a visual display, touchscreen display, or indicator lights. Audible feedback 2334 may be transmitted through a loudspeaker or other audio transducer. Tactile feedback may be provided through a vibration module 2336.

In some aspects, the drone 2302 may comprise a motion sensor 2338, wherein the motion sensor 2338 and associated circuitry may convert the motion of the drone 2302 into machine-compatible signals. For example, the motion sensor 2338 may comprise an accelerometer, which may be used to sense measurable physical acceleration, orientation, vibration, and other movements. In some embodiments, the motion sensor 2338 may comprise a gyroscope or other device to sense different motions.

In some implementations, the drone 2302 may comprise a location sensor 2340, wherein the location sensor 2340 and associated circuitry may be used to determine the location of the device. The location sensor 2340 may detect Global Position System (GPS) radio signals from satellites or may also use assisted GPS where the drone may use a cellular network to decrease the time necessary to determine location. In some embodiments, the location sensor 2340 may use radio waves to determine the distance from known radio sources such as cellular towers to determine the location of the drone 2302. In some embodiments these radio signals may be used in addition to and/or in conjunction with GPS.

In some aspects, the drone 2302 may comprise a logic module 2326, which may place the components of the drone 2302 into electrical and logical communication. The electrical and logical communication may allow the components to interact. Accordingly, in some embodiments, the received signals from the components may be processed into different formats and/or interpretations to allow for the logical communication. The logic module 2326 may be operable to read and write data and program instructions stored in associated storage 2330, such as RAM, ROM, flash, or other suitable memory. In some aspects, the logic module 2326 may read a time signal from the clock unit 2328. In some embodiments, the drone 2302 may comprise an on-board power supply 2342. In some embodiments, the drone 2302 may be powered from a tethered connection to another device, such as a Universal Serial Bus (USB) connection.

In some implementations, the drone 2302 may comprise a network interface 2316, which may allow the drone 2302 to communicate and/or receive data to a network and/or an associated computing device. The network interface 2316 may provide two-way data communication. For example, the network interface 2316 may operate according to an internet protocol. As another example, the network interface 2316 may comprise a local area network (LAN) card, which may allow a data communication connection to a compatible LAN. As another example, the network interface 2316 may comprise a cellular antenna and associated circuitry, which may allow the drone to communicate over standard wireless data communication networks. In some implementations, the network interface 2316 may comprise a Universal Serial Bus (USB) to supply power or transmit data. In some embodiments, other wireless links known to those skilled in the art may also be implemented.

Figure 24:
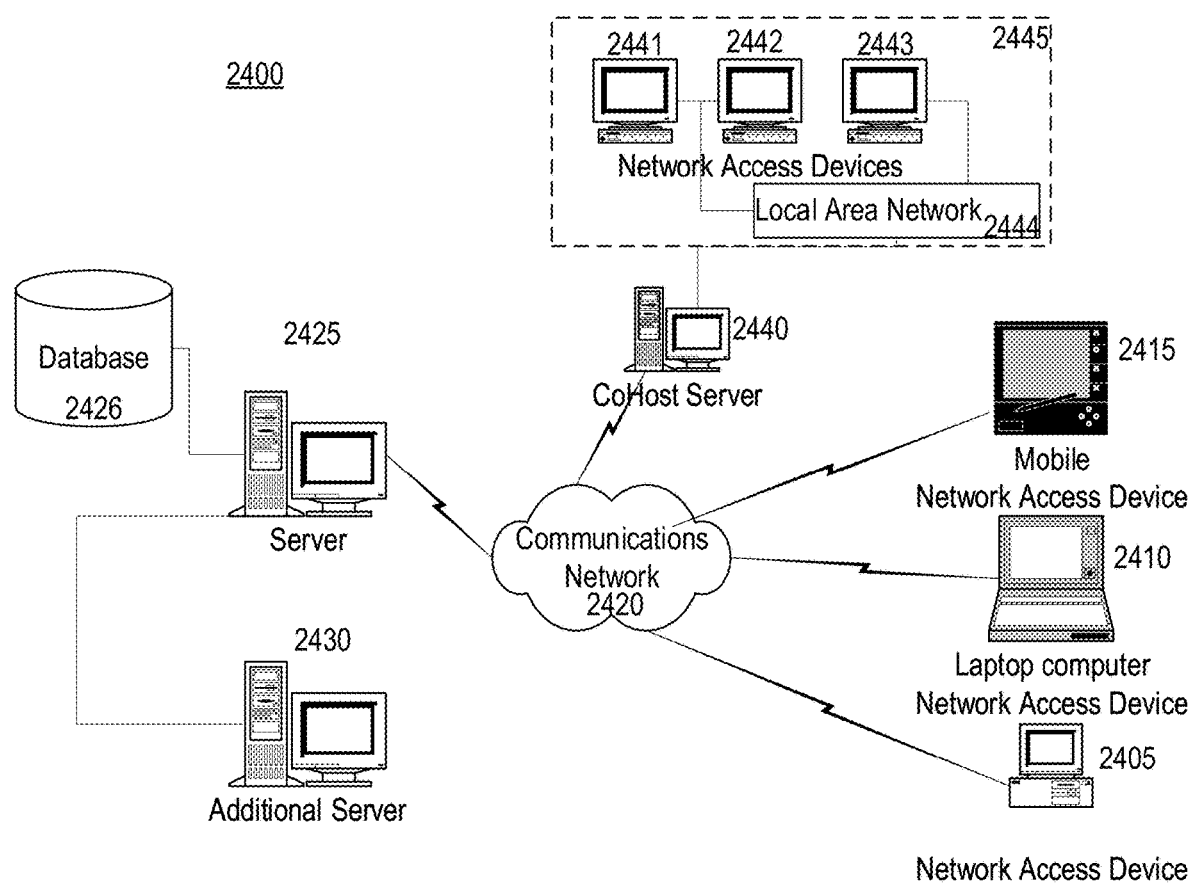
FIG. 24 illustrates an exemplary processing and interface system, according to some embodiments of the present disclosure.

Referring now to FIG. 24, an exemplary processing and interface system 2400 is illustrated. In some aspects, access devices 2415, 2410, 2405, such as a paired portable device 2415 or laptop computer 2410 may be able to communicate with an external server 2425 though a communications network 2420. The external server 2425 may be in logical communication with a database 2426, which may comprise data related to identification information and associated profile information. In some embodiments, the server 2425 may be in logical communication with an additional server 2430, which may comprise supplemental processing capabilities.

In some aspects, the server 2425 and access devices 2405, 2410, 2415 may be able to communicate with a cohost server 2440 through a communications network 2420. The cohost server 2440 may be in logical communication with an internal network 2445 comprising network access devices 2441, 2442, 2443 and a local area network 2444. For example, the cohost server 2440 may comprise a payment service, such as PayPal or a social network, such as Facebook or a dating website.

Conclusion

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multi-tasking and parallel processing may be advantageous. Nevertheless, it will be understood that various modifications may be made without departing from the spirit and scope of the claimed disclosure.

What is claimed is:

1. A drone with ducted rotors comprising:
   a body;
   a first duct connected to the body;
   a first rotor system located within the first duct, wherein the first rotor system provides lift and propulsion for flight of the drone;
   a power source connected;
   a control mechanism configured to operate flight of the drone, wherein the control mechanism is in logical communication with the power source;
   a communication mechanism configured to receive instructions for operation of the drone and relay instructions to the control mechanism;
   a directional control mechanism configured to affect a direction of flight of the drone, wherein the directional control mechanism comprises a cone that controls direction of airflow from the first rotor system, and wherein direction of airflow controls the direction of flight; and
   a housing connected to the body, wherein the housing contains at least a portion of one or more of the power source, the control mechanism, the communication mechanism, and the directional control mechanism.

2. The drone of claim 1, wherein the directional control mechanism further comprises a vane that further controls direction of airflow from the first rotor system.

3. The drone of claim 1, wherein the duct is located centrally to the body.

4. The drone of claim 1, further comprising:
   a second duct connected to the body; and
   a second rotor system located within the second duct, wherein the first rotor system and the second rotor system provide lift and propulsion for flight of the drone.

5. The drone of claim 4, wherein the body is located between the first duct and the second duct.

6. The drone of claim 4, wherein the drone is configured to operate with one or both the first rotor system and the second rotor system.

7. The drone of claim 6, wherein loss of either the first rotor system or the second rotor system causes a shift in orientation of the body.

8. The drone of claim 4, wherein the first rotor system and the second rotor system are independently controllable.

9. The drone of claim 4, wherein the first rotor system and the second rotor system are controllable as a single system.

10. The drone of claim 1, further comprising an expandable landing mechanism configured to slow a descent of the drone.

11. The drone of claim 10, wherein the expandable landing mechanism is configured to deploy if the first rotor system fails.

12. The drone of claim 10, wherein the body comprises a walled frame, and the expandable landing mechanism comprises a series of expandable panels lining the walled frame.

13. The drone of claim 10, wherein the expandable landing mechanism comprises collapsible wings.

14. The drone of claim 10, wherein the expandable landing mechanism is configured to rotate on descent when deployed.

15. The drone of claim 1, wherein an angle of the first duct is adjustable.

16. The drone of claim 15, wherein the angle of the first duct affects the direction of flight, and wherein the directional control mechanism adjusts the angle of the first duct.

17. The drone of claim 1, wherein an angle of the first rotor system is adjustable.

18. The drone of claim 17, wherein the directional control mechanism adjusts the angle of the first rotor system.

19. The drone of claim 17, wherein a first angle of the first rotor system provides primarily lift and a second angle of the first rotor system provides primarily propulsion.

* * * * *